(12) United States Patent
Takeda

(10) Patent No.: US 9,461,822 B2
(45) Date of Patent: Oct. 4, 2016

(54) IMAGE FORMING APPARATUS, CONTROL METHOD, AND STORAGE MEDIUM

(71) Applicant: CANON KABUSHIKI KAISHA, Tokyo (JP)

(72) Inventor: Kyohei Takeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/486,000

(22) Filed: Sep. 15, 2014

(65) Prior Publication Data

US 2015/0082036 A1 Mar. 19, 2015

(30) Foreign Application Priority Data

Sep. 17, 2013 (JP) .................................. 2013-192198
Apr. 10, 2014 (JP) .................................. 2014-081200

(51) Int. Cl.
*H04L 9/32* (2006.01)
*H04L 9/08* (2006.01)
*H04L 9/14* (2006.01)

(52) U.S. Cl.
CPC ............. *H04L 9/088* (2013.01); *H04L 9/0894* (2013.01); *H04L 9/14* (2013.01)

(58) Field of Classification Search
CPC ........ H04L 9/088; H04L 9/14; H04L 9/0894
USPC ......................................................... 713/168
See application file for complete search history.

(56) References Cited

U.S. PATENT DOCUMENTS

| | | | | |
|---|---|---|---|---|
| 9,065,633 | B2 * | 6/2015 | Yamada | ................... H04L 63/04 |
| 2005/0086300 | A1 * | 4/2005 | Yeager | .................... G06F 9/544 |
| | | | | 709/204 |
| 2008/0270806 | A1 * | 10/2008 | Nakamura | ............ G06F 9/4435 |
| | | | | 713/190 |
| 2013/0182846 | A1 * | 7/2013 | Yamada | .................. H04L 63/04 |
| | | | | 380/270 |

FOREIGN PATENT DOCUMENTS

JP 2011-004117 A 1/2011

* cited by examiner

*Primary Examiner* — Teshome Hailu
(74) *Attorney, Agent, or Firm* — Canon U.S.A., Inc. IP Division

(57) ABSTRACT

An image forming apparatus includes a storage unit configured to store a plurality of encryption keys, wherein the plurality of encryption keys includes at least a default key, a setting unit configured to set an encryption key to be used for encryption communication according to a specific protocol, wherein the encryption key is selected from the plurality of encryption keys, an obtaining unit configured to obtain security setting information for limiting use of an encryption key, and a control unit configured to, in the case where the security setting information is obtained, determine whether or not the encryption key set by the setting unit has a predetermined encryption strength, wherein the control unit is configured to change the set encryption key to the default key in response to determining that the set encryption key has not the predetermined encryption strength.

20 Claims, 35 Drawing Sheets

MFP 01234

PLEASE INPUT ID/PASSWORD TO LOG IN.

ID

PASSWORD

LOGIN

SECURITY POLICY SETTING

PROHIBITION OF USE OF
WEAK CRYPTOGRAPHY     ENABLED

THE ABOVE SETTING IS REFLECTED.

| CRYPTOGRAPHY PROHIBITED FROM BEING USED ||
|---|---|
| HASH CRYPTOGRAPHY | SHA1/MD2/MD4/MD5 |
| COMMON KEY CRYPTOGRAPHY | DES/3DES/RC4 |
| PUBLIC KEY CRYPTOGRAPHY | RSA/DSA/DH OF WHICH KEY LENGTH IS 1024 BITS OR LESS |

SSL KEY SETTING SCREEN

| SELECT | NAME OF KEY | USAGE OF KEY | CERTIFICATE |
|---|---|---|---|
| ○ | Default Key | SSL | ☐ |
| ● | Key 1 | — | ☐ |
| ○ | Key 2 | IEEE802.1X | ☐ |
| ○ | Key 3 | IPSec | ☐ |
| ○ | Key 4 | — | ☐ |

1401

SET — 1402

SETTING OF KEY AND CERTIFICATE

USAGE OF KEY CANNOT BE SET
SINCE USE OF WEAK CRYPTOGRAPHY
IS RESTRICTED BY SECURITY POLICY.

ID OR CONNECTION DESTINATION OF THE Web SITE CANNOT BE CONFIRMED.

THE SECURITY CERTIFICATE IS NOT ISSUED BY A TRUSTED AUTHORITY.
PLEASE DECIDE WHETHER TO TRUST THE CERTIFICATE AUTHORITY BY DISPLAYING THE CERTIFIER.

DATE OF THE CERTIFICATE IS VALID.

THE NAME OF THE SECURITY CERTIFICATE IS INVALID OR DOES NOT MATCH THE NAME OF THE SITE.

DO YOU WANT TO CONTINUE THE PROCESSING?

| YES | NO | DISPLAY CERTIFICATE |
|---|---|---|
| *1901* | *1902* | *1903* |

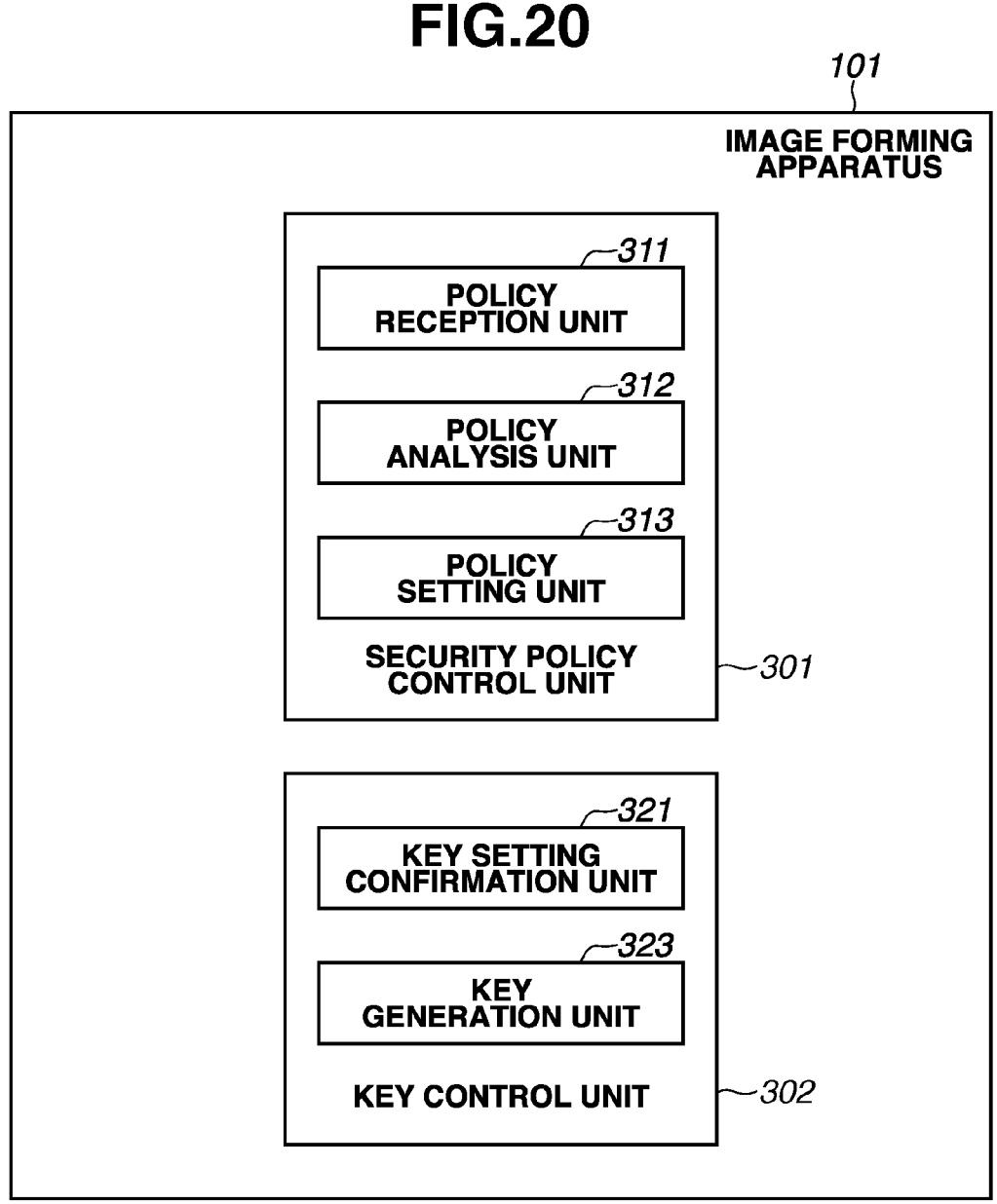

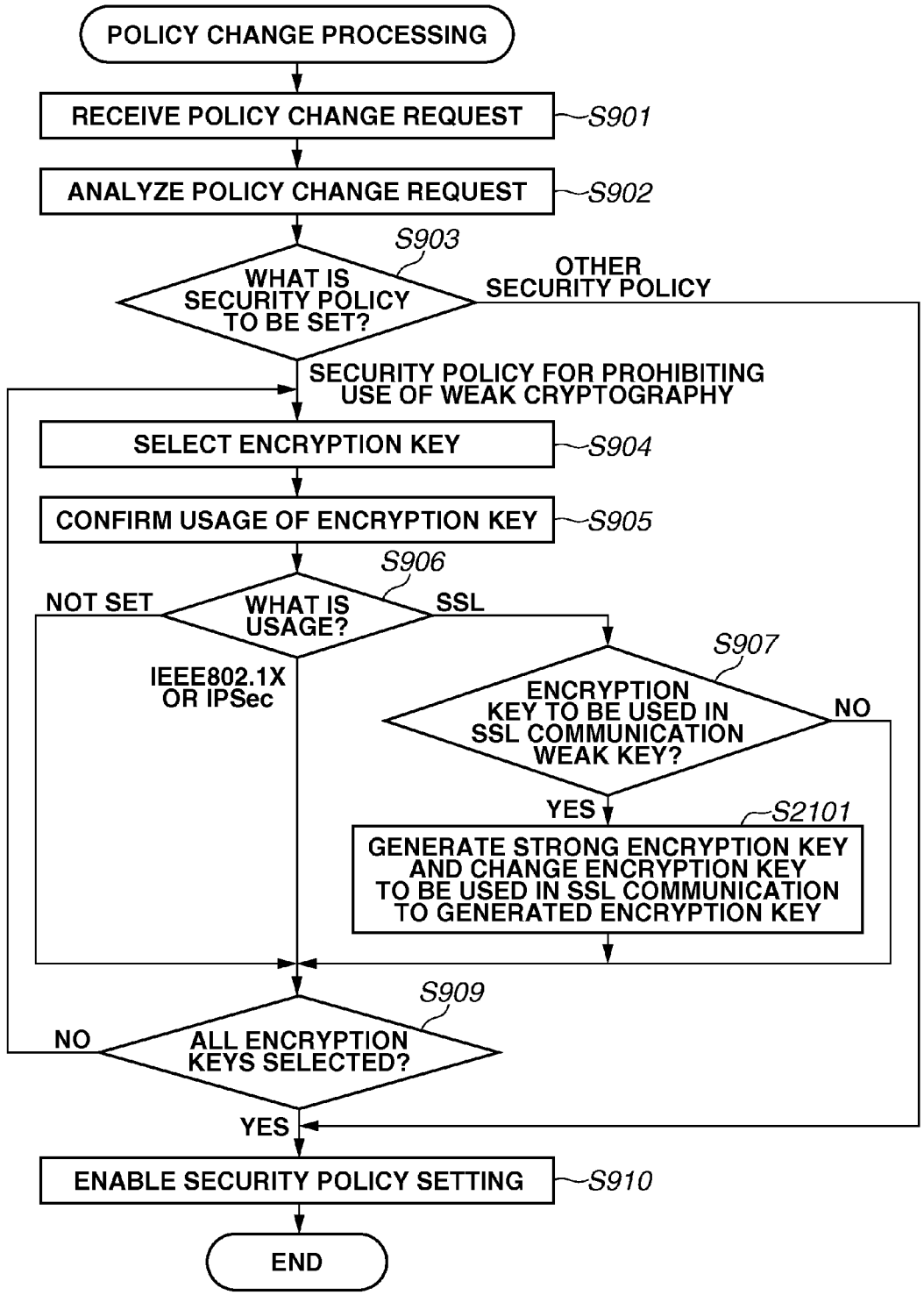

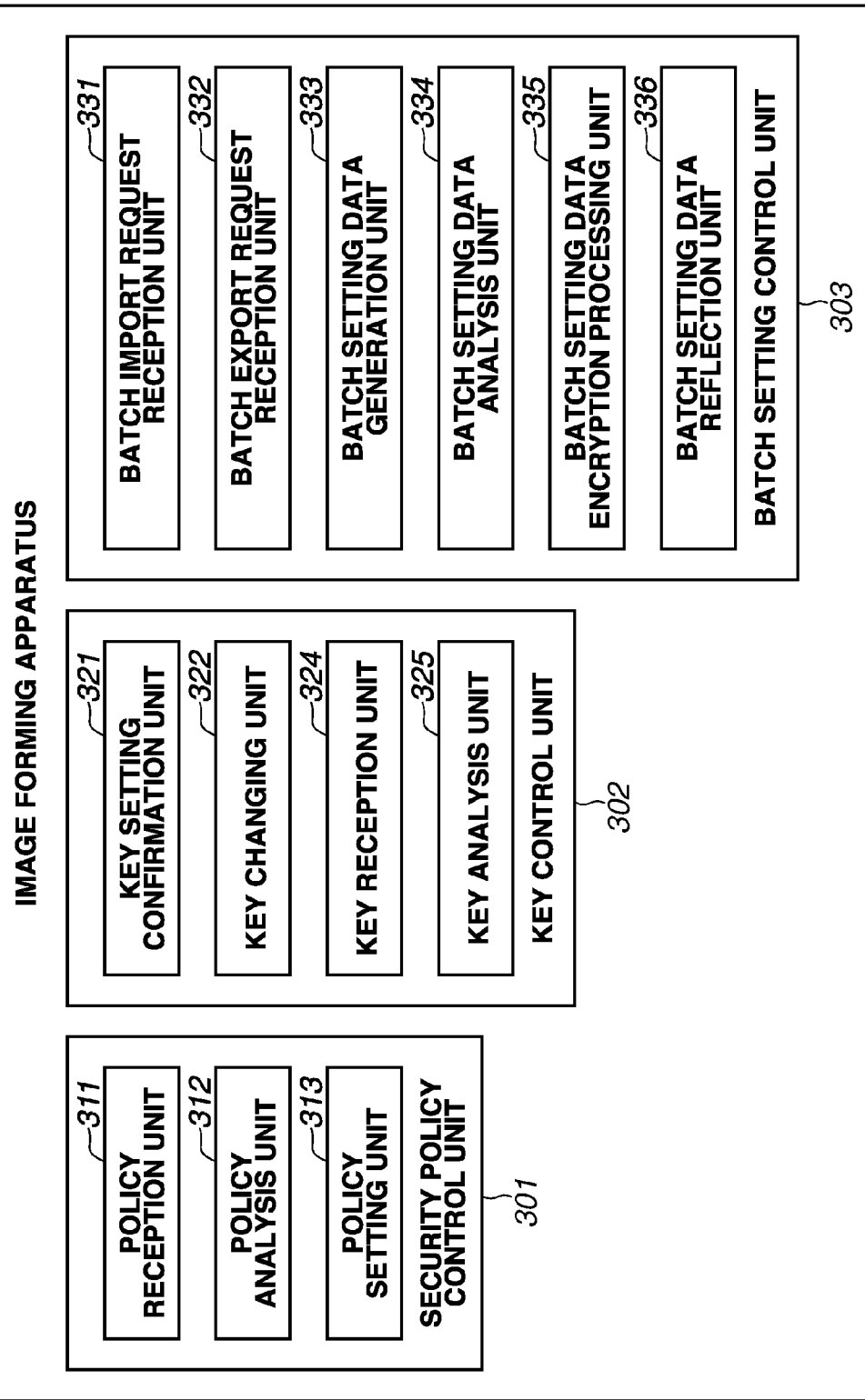

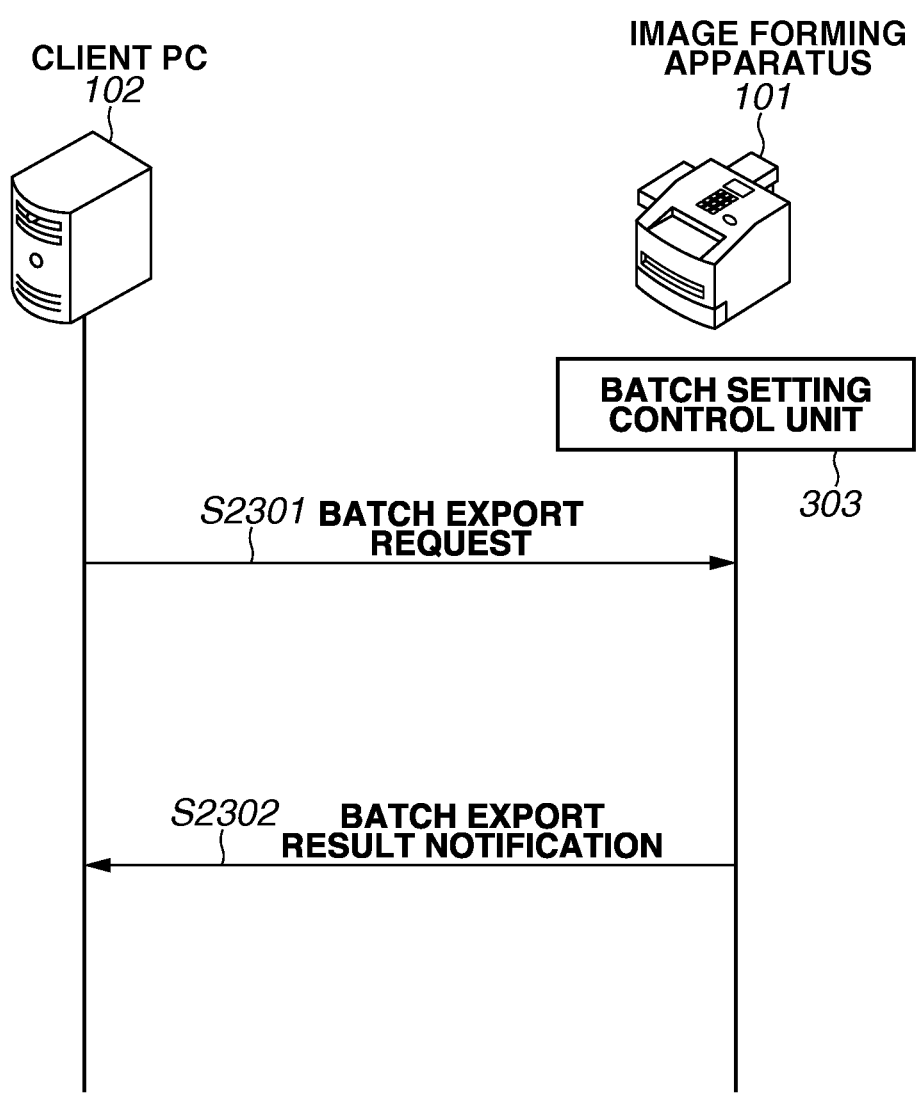

```
2701 — <security policy setting>
2702 —   <weak key policy>
2703 —     <value = "OK">
         </weak key policy>
       </security policy setting>

2704 — <key setting>
2705 —   <device key1>
2706 —     <name = "key1", usage = "SSL">
2707 —     <data = "01234567890123456789…">
         </device key1>
2708 —   <device key2>
           <name = "key2", usage = "IEEE802.1x">
           <data = "12345678901234567890…">
         </device key2>
       </key setting>
```

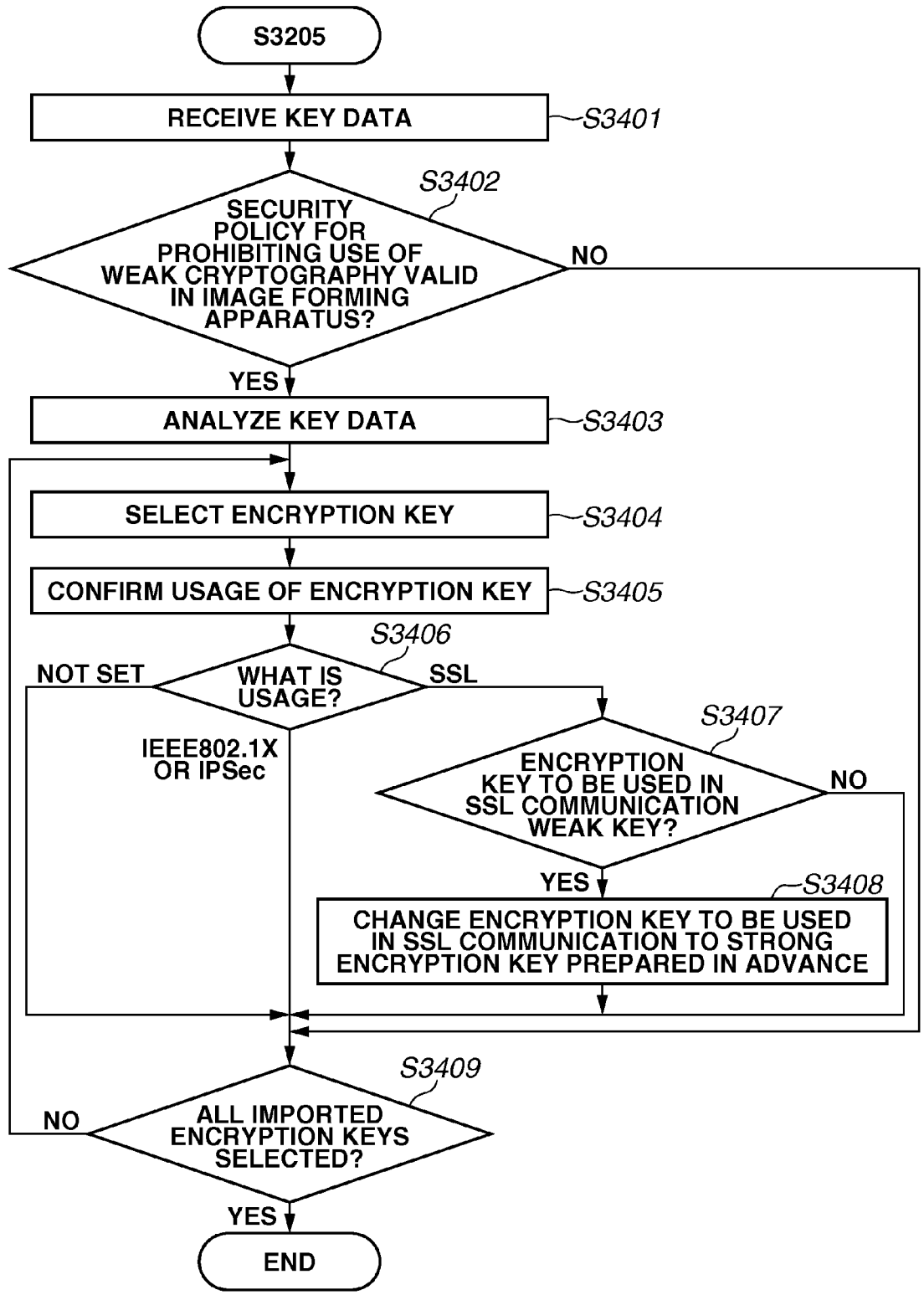

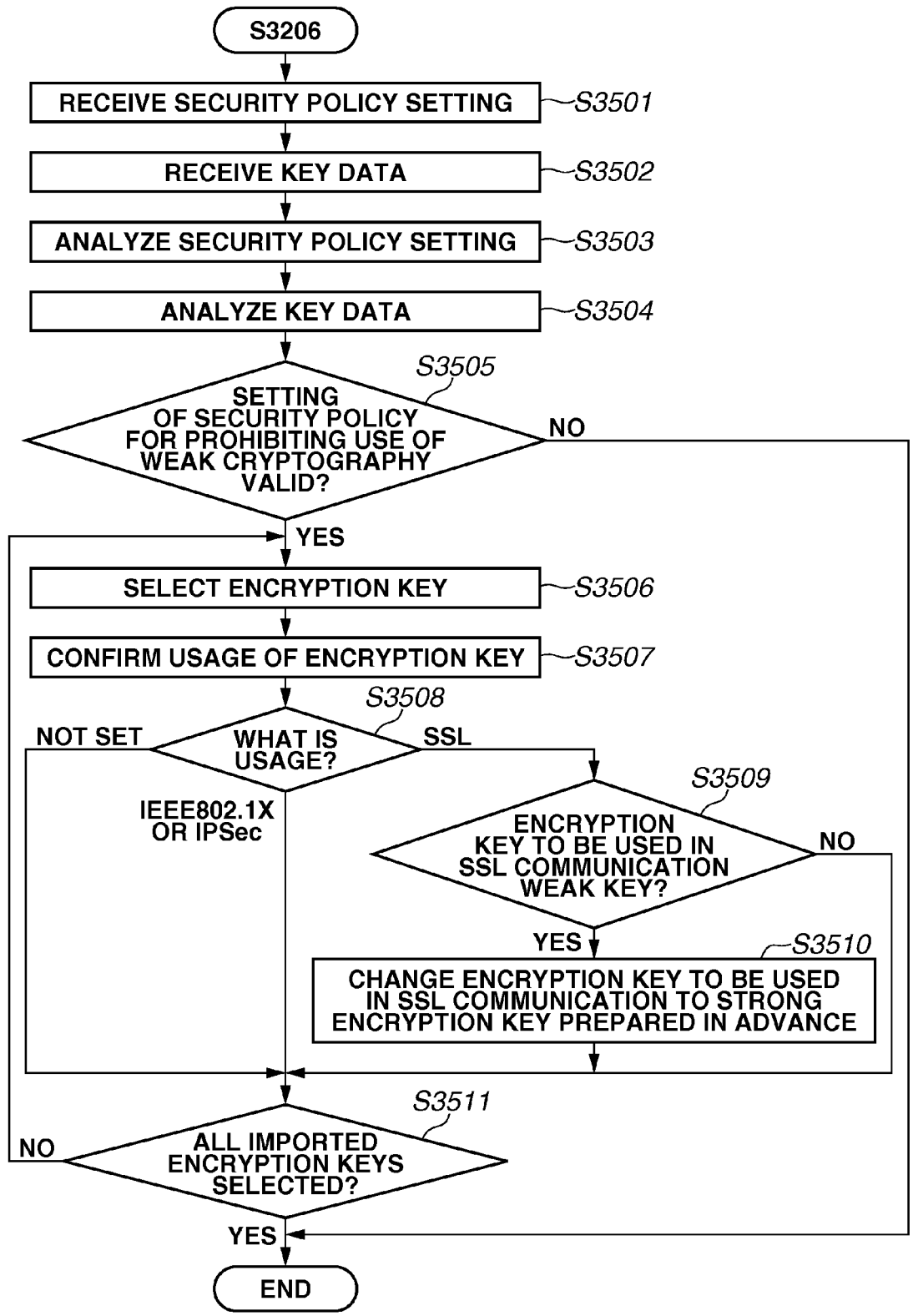

IMAGE FORMING APPARATUS, CONTROL METHOD, AND STORAGE MEDIUM

BACKGROUND OF THE INVENTION

1. Field of the Invention

The present invention relates to an image forming apparatus, a security policy setting method according to the image forming apparatus, and a computer program, and is especially useful for setting a security policy in the network environment.

2. Description of the Related Art

It is desirable that a personal computer (PC) and server devices (a file server, an authentication server, and the like) to be connected to a network in an office are operated in accordance with an information security policy defined by each office. The information security policy is a basic policy regarding the information security of the whole enterprise and is a collection of policies for utilizing information and for preventing invasion from the outside and information leakage, which is developed by an administrator dealing with the security.

The device to be connected to the network in the office includes a peripheral device such as a multifunction peripheral in addition to the above-described PC and server device. The recent multifunction peripheral has functions not only for simply printing and transmitting an image but also for storing image data in the multifunction peripheral and providing a file service to the PC. Therefore, the multifunction peripheral becomes able to play a role similar to other server devices existing on the network. In addition, a development environment of an application to be installed in the multifunction peripheral has been disclosed recently, and an application developed by a manufacturer different from that of the multifunction peripheral is used in the multifunction peripheral as in the case with the PC.

Maintenance of a safe and secure office environment requires the multifunction peripheral to comply with the information security policy as with the PC and the server device. The term "comply with the information security policy" here means that limitations are placed on operations regarding security, such that user authentication is essential to operate the multifunction peripheral, in order to prevent an unjustified use of the multifunction peripheral in the office and information leakage.

In order to comply with the information security policy, there is a method that a delivery server collectively sets setting values depending on an operating system (OS), (hereinbelow, referred to as a security policy) and collectively delivers the set security policy to each device. In addition to the method for collectively delivering the security policy from the delivery server, the security policy can be individually set by accessing the device from a browser screen of the PC.

As a technique for setting a security policy, there is a technique discussed in Japanese Patent Application Laid-Open No. 2011-4117. Japanese Patent Application Laid-Open No. 2011-4117 suggests the technique, if there is a job which is against a security policy when the security policy is enabled, for performing processing with respect to the job so as to meet the security policy.

There may be a case that a security policy for "prohibiting use of a weak cryptography" is set to a multifunction peripheral to enhance its safety. If such security policy for "prohibiting use of a weak cryptography" can be applied to the multifunction peripheral, peripheral devices such as the multifunction peripheral cannot perform communication using an encryption key and a certificate going against to the security policy.

SUMMARY OF THE INVENTION

The present invention is first directed to enabling a security policy for prohibiting use of a weak cryptography to be applied to an image forming apparatus. In addition, the present invention is secondly directed to enabling communication by a protocol set as a usage of an encryption key in the case where use of the encryption key is prohibited.

According to an aspect of the present invention, an image forming apparatus includes a storage unit configured to store a plurality of encryption keys, wherein the plurality of encryption keys includes at least a default key, a setting unit configured to set an encryption key to be used for encryption communication according to a specific protocol, wherein the encryption key is selected from the plurality of encryption keys, an obtaining unit configured to obtain security setting information for limiting use of an encryption key, and a control unit configured to, in the case where the security setting information is obtained, determine whether or not the encryption key set by the setting unit has a predetermined encryption strength, wherein the control unit is configured to change the set encryption key to the default key in response to determining that the set encryption key has not the predetermined encryption strength.

Further features of the present invention will become apparent from the following description of exemplary embodiments with reference to the attached drawings.

BRIEF DESCRIPTION OF THE DRAWINGS

FIG. 5 illustrates a login screen.

FIG. 8 illustrates a security policy setting result display screen.

FIG. 12 illustrates an encryption key which is prohibited from being used by a security policy.

FIG. 14 illustrates a Secure Sockets Layer (SSL) key setting screen.

FIG. 15 illustrates a setting failure notification screen.

FIG. 19 illustrates a using key confirmation screen.

FIG. 20 illustrates a second example of a software configuration of the image forming apparatus.

FIG. 21 is a flowchart illustrating a second example of policy change processing.

FIG. 22 illustrates a third example of a software configuration of the image forming apparatus.

FIG. 23 illustrates processing executed when batch export is performed.

FIG. 27 illustrates batch setting data.

FIG. 34 is a flowchart illustrating details of processing in step S3205.

FIG. 35 is a flowchart illustrating details of processing in step S3206.

DESCRIPTION OF THE EMBODIMENTS

Various exemplary embodiments, features, and aspects of the present invention will be described in detail below with reference to the drawings.

A first exemplary embodiment is described below.

Figure 1:
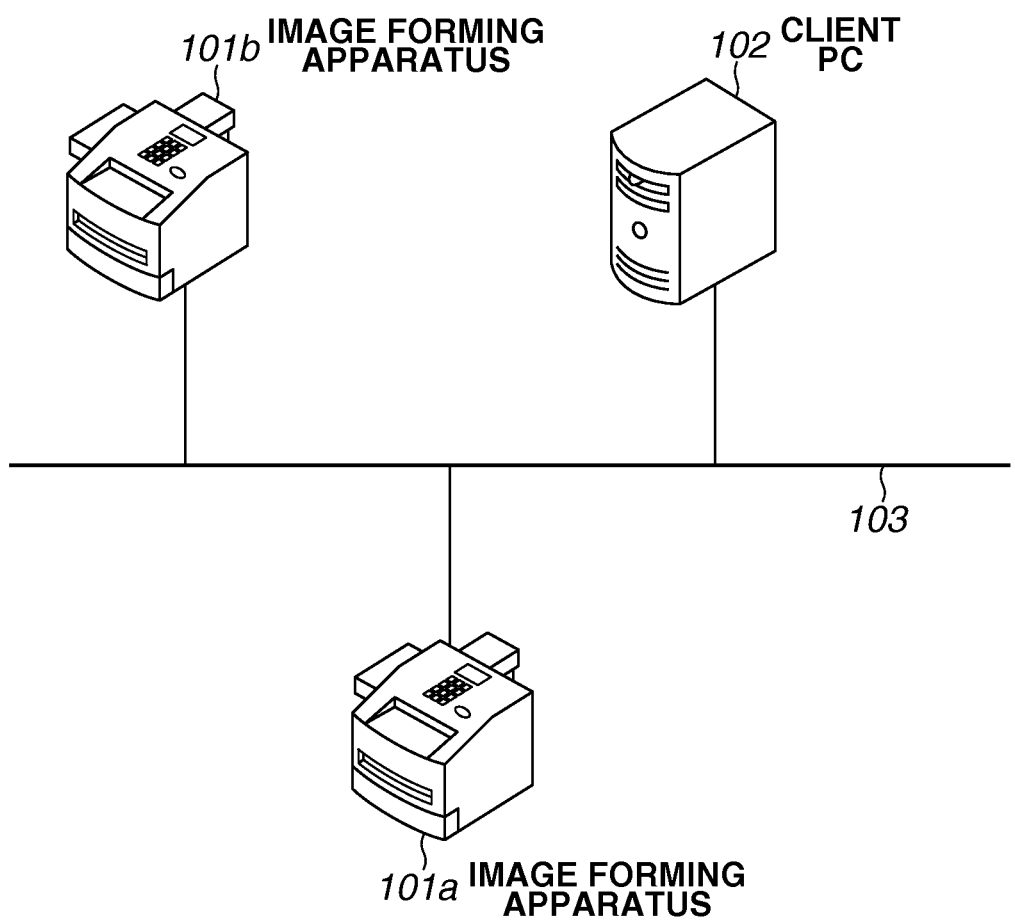
FIG. 1 illustrates a configuration of a network system

FIG. 1 illustrates an example of a configuration of a network system in which an image forming apparatus is used. In FIG. 1, image forming apparatuses 101a and 101b and a client PC 102 are connected to a network 103 and can communicate with each other. The image forming apparatuses 101a and 101b may be a same type or a different type with each other. In the following descriptions, the image forming apparatuses 101a and 101b are regarded as the same type and collectively referred to as an image forming apparatus 101.

When a uniform resource locator (URL) of the image forming apparatus 101a or 101b is input to a browser screen of the client PC 102 based on an operation made by a user, the client PC 102 displays a security policy setting screen. Based on a user operation to the security policy setting screen, the client PC 102 can collectively or individually perform setting of a security policy with respect to the image forming apparatus 101 remotely (from the client PC 102) by encryption communication.

Figure 2:
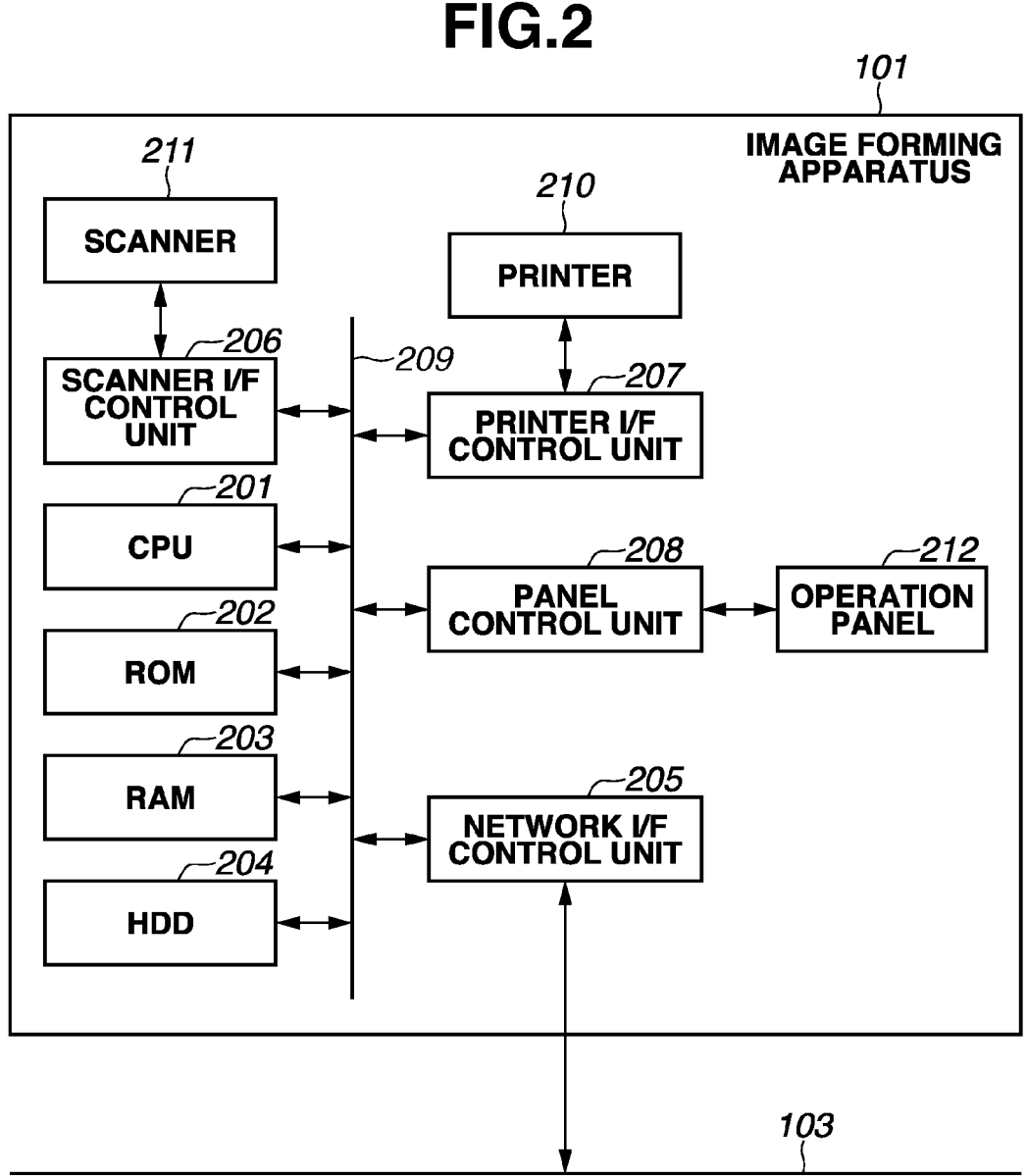
FIG. 2 illustrates a hardware configuration of an image forming apparatus.

FIG. 2 is a block diagram illustrating an example of a hardware configuration of the image forming apparatus 101.

In FIG. 2, a central processing unit (CPU) 201 executes a software program of the image forming apparatus 101 to entirely control the image forming apparatus 101. A read-only memory (ROM) 202 stores a boot program, fixed parameters, and the like of the image forming apparatus 101. A random access memory (RAM) 203 is used as a temporary storage of data or the like when the CPU 201 controls the image forming apparatus 101. A hard disk drive (HDD) 204 is used to store various pieces of data, such as print data.

A network interface (I/F) control unit 205 controls transmission and reception of data between the network 103 A scanner I/F control unit 206 is a device for controlling a scanner 211. A printer I/F control unit 207 is a device for controlling a printer 210. A panel control unit 208 controls an operation panel 212 to display various types of information and to input an instruction from a user.

A bus 209 is a system bus for transmitting and receiving a control signal from the CPU 201 and a data signal between each of the devices. The CPU 201, the ROM 202, the RAM 203, the HDD 204, the network I/F control unit 205, the scanner I/F control unit 206, the printer I/F control unit 207, and the panel control unit 208 are connected to the bus 209.

Figure 3:
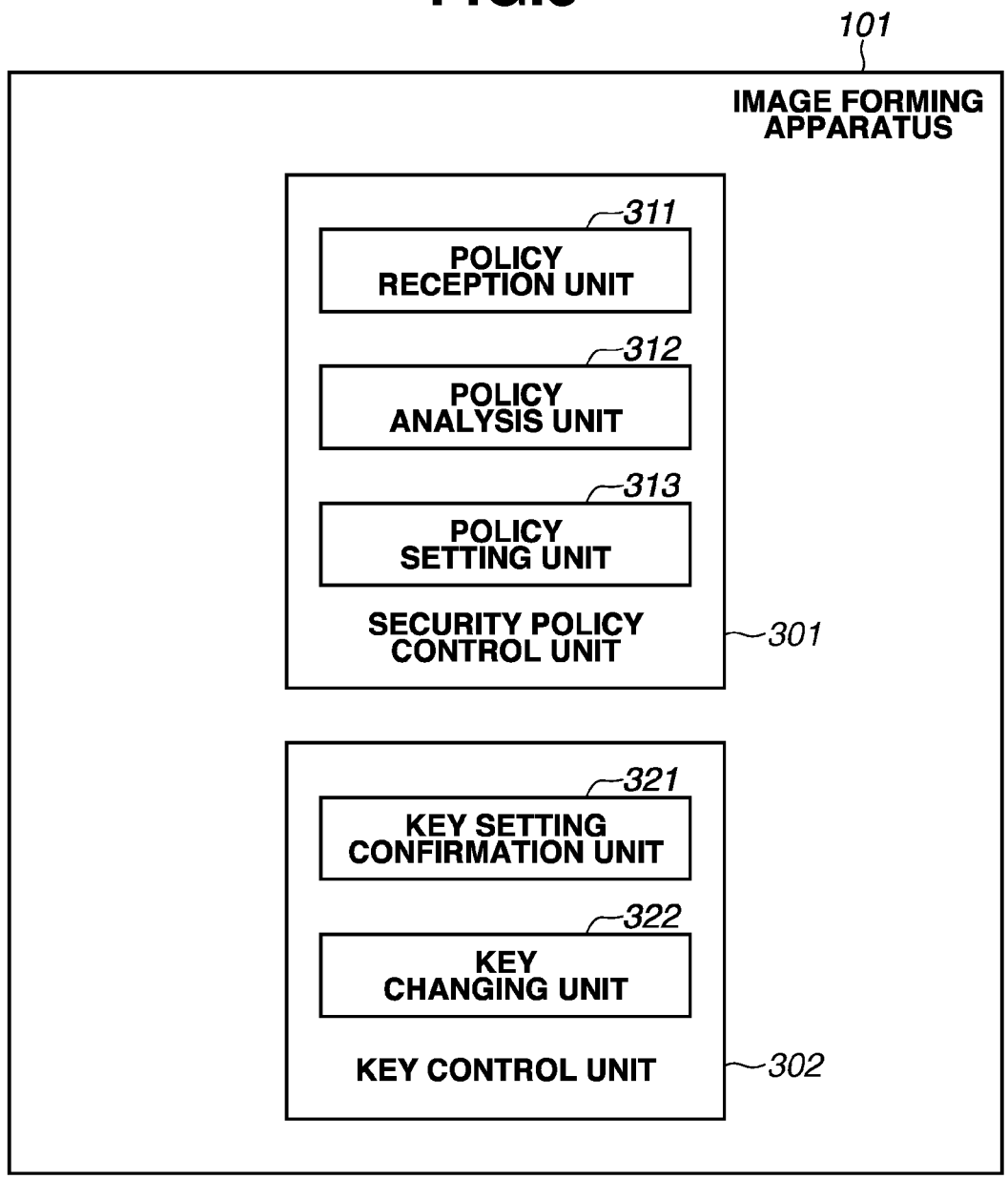
FIG. 3 illustrates a first example of a software configuration of the image forming apparatus.

FIG. 3 is a block diagram illustrating an example of a software configuration of the image forming apparatus 101.

A security policy control unit 301 is realized by, for example, using a software program for controlling a security policy. The security policy control unit 301 includes a policy reception unit 311, a policy analysis unit 312, and a policy setting unit 313. A key control unit 302 is realized by, for example, using a software program for controlling a key. The key control unit 302 includes a key setting confirmation unit 321 and a key changing unit 322.

The policy reception unit 311 receives a security policy.

The policy analysis unit 312 analyzes the security policy received by the policy reception unit 311.

The policy setting unit 313 applies the security policy received by the policy reception unit 311 to the image forming apparatus 101.

When a security policy for prohibiting an encryption key having a low encryption strength from being used in encryption for encryption communication is applied, the key setting confirmation unit 321 confirms an encryption key to be used by each application in the image forming apparatus 101. In the following descriptions, "a security policy for prohibiting an encryption key having a low encryption strength from being used in encryption for encryption communication" is referred to as "a security policy for prohibiting use of a weak cryptography" as necessary.

The key changing unit 322 changes an encryption key which is confirmed as vulnerable by the key setting confirmation unit 321 to a strong encryption key which is set in advance.

Software programs for realizing the security policy control unit 301 and the key control unit 302 are stored in the ROM 202, for example. The CPU 201 develops the software program to the RAM 203 and executes it when controlling the image forming apparatus 101.

Figure 4:
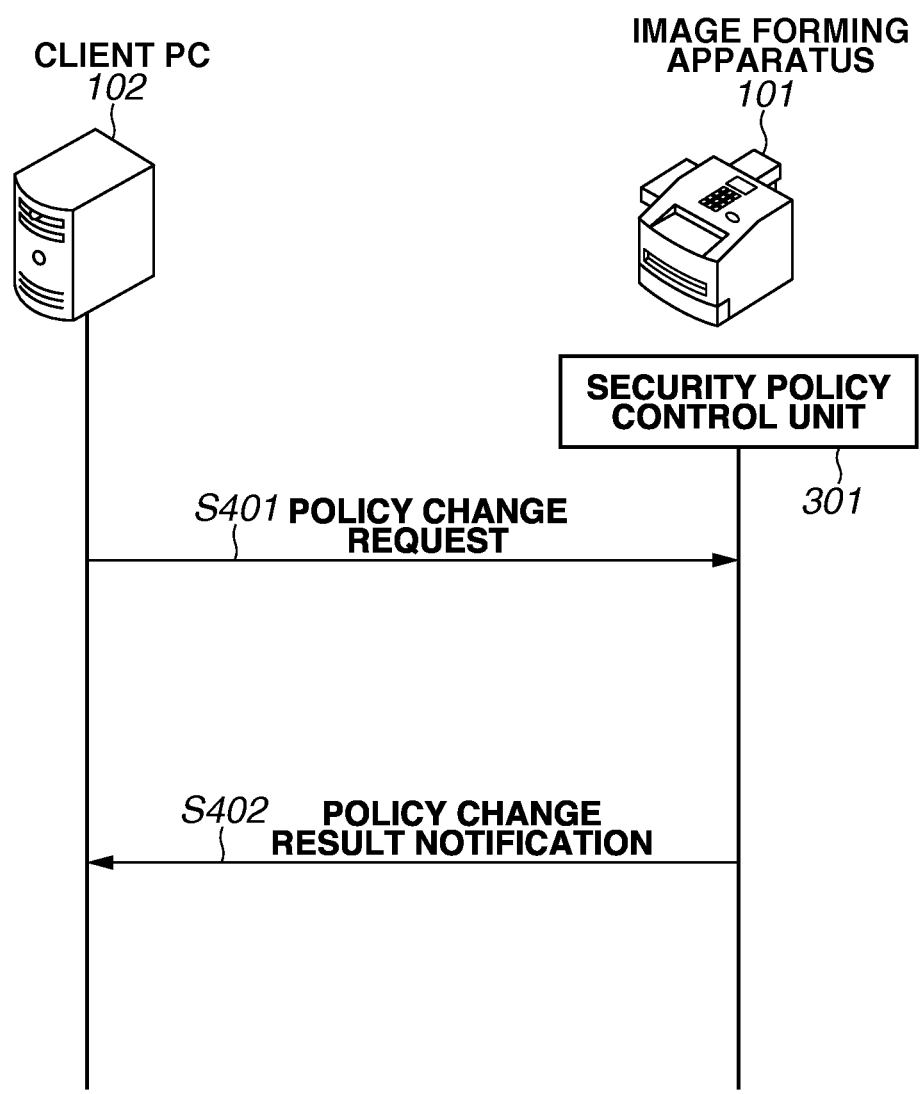
FIG. 4 illustrates processing executed when a security policy is set.

FIG. 4 is a sequence diagram illustrating an example of processing to be executed when a security policy is set to the image forming apparatus 101.

Figure 6:
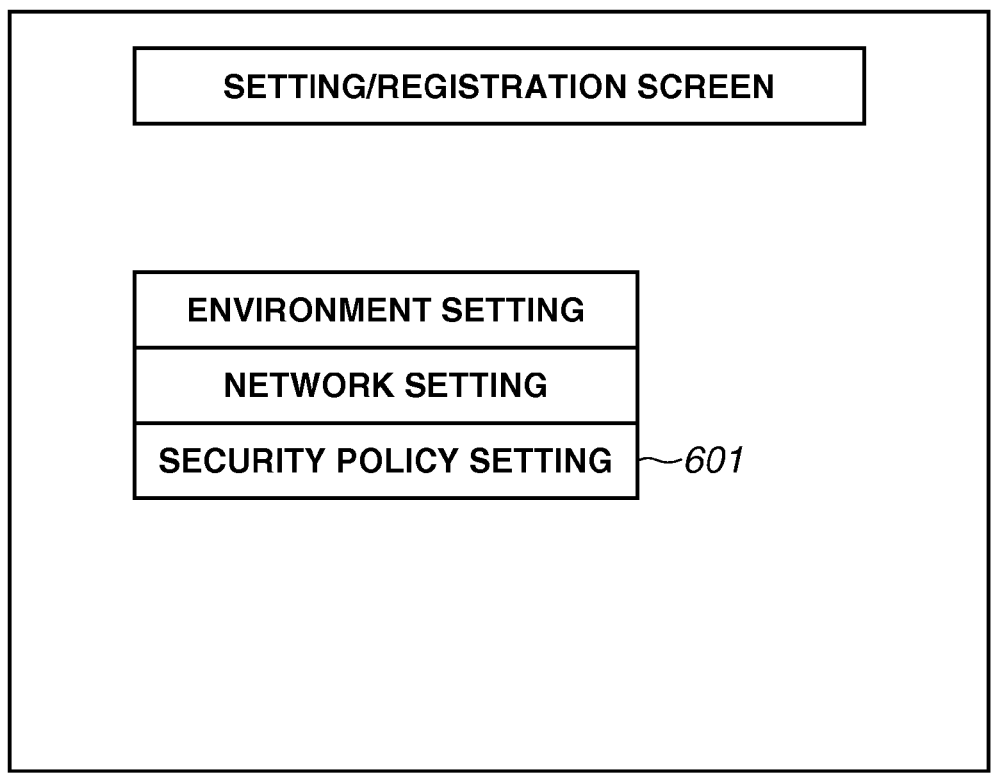
FIG. 6 illustrates a setting registration screen.

When the security policy is set, first, the client PC 102 starts up a browser. When a URL of the image forming apparatus 101 is input to a URL entry field of the browser, a login screen 500 illustrated in FIG. 5 is displayed on a browser screen. When a user identification (ID) and a password are input to the login screen 500 and login is successful, the browser screen is shifted from the login screen 500 to a setting registration screen 600 illustrated in FIG. 6. When a security policy setting button 601 is selected on the setting registration screen 600, the browser screen is shifted from the setting registration screen 600 to a security policy setting screen 700 illustrated in FIG. 7. According to the present exemplary embodiment, communication in Secure Sockets Layer (SSL) is required for performing setting of the security policy (displaying and operating the security policy setting screen 700, delivery of the security policy to the image forming apparatus 101, and so on). Thus, an access from the client PC 102 to the image forming apparatus 101 here is performed in SSL.

Figure 7:
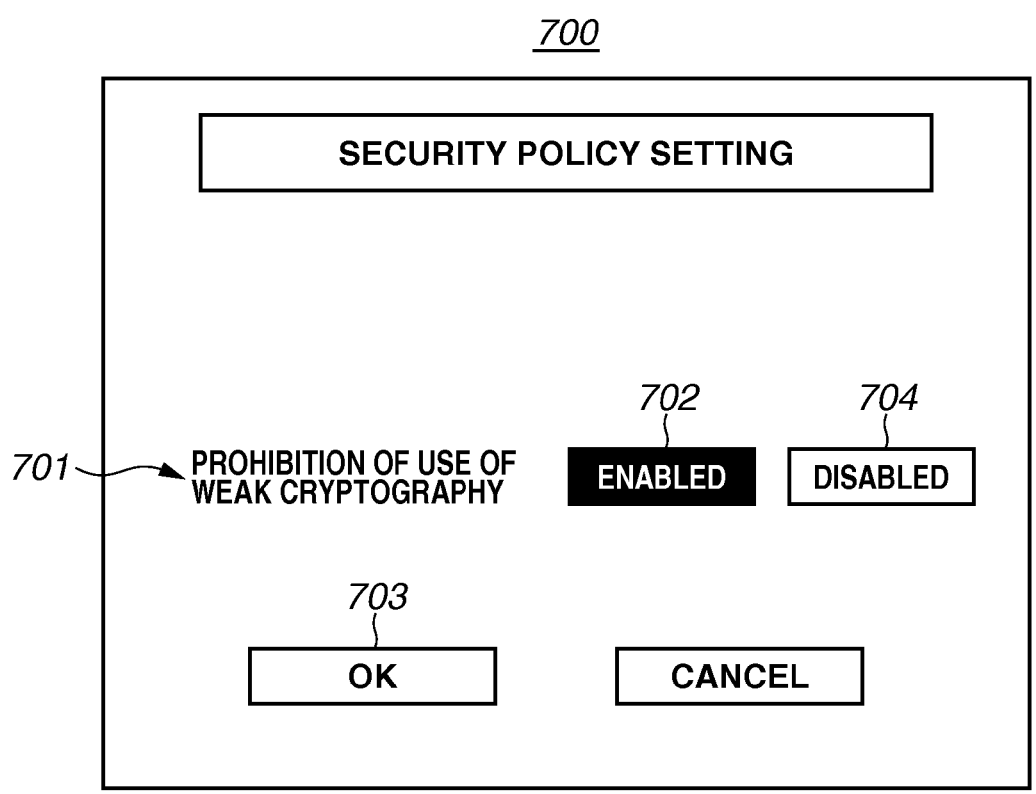
FIG. 7 illustrates a security policy setting screen.

Various security policies can be set on the security policy setting screen 700 in FIG. 7. However, only a user interface related to a setting of a security policy for prohibiting use of a weak cryptography 701 is shown in FIG. 7. When an OK button 703 is pressed in a state that an enabled button 702 is selected on the security policy setting screen 700, in step S401, a policy change request is transmitted from the client PC 102 to the image forming apparatus 101. In step S402, the security policy control unit 301 processes the policy change request, and then, transmits a policy change result notification to the client PC 102. When the client PC 102 receives the policy change result notification, a security policy setting result display screen 800 illustrated in FIG. 8 is displayed on the browser screen of the client PC 102.

In addition, if the OK button 703 is pressed in a state that a disabled button 704 is selected on the security policy setting screen 700 in FIG. 7, transmission of the policy change request and the policy change result notification are performed. In that case, the setting of the security policy for prohibiting use of a weak cryptography is canceled in the image forming apparatus 101.

Figure 9:
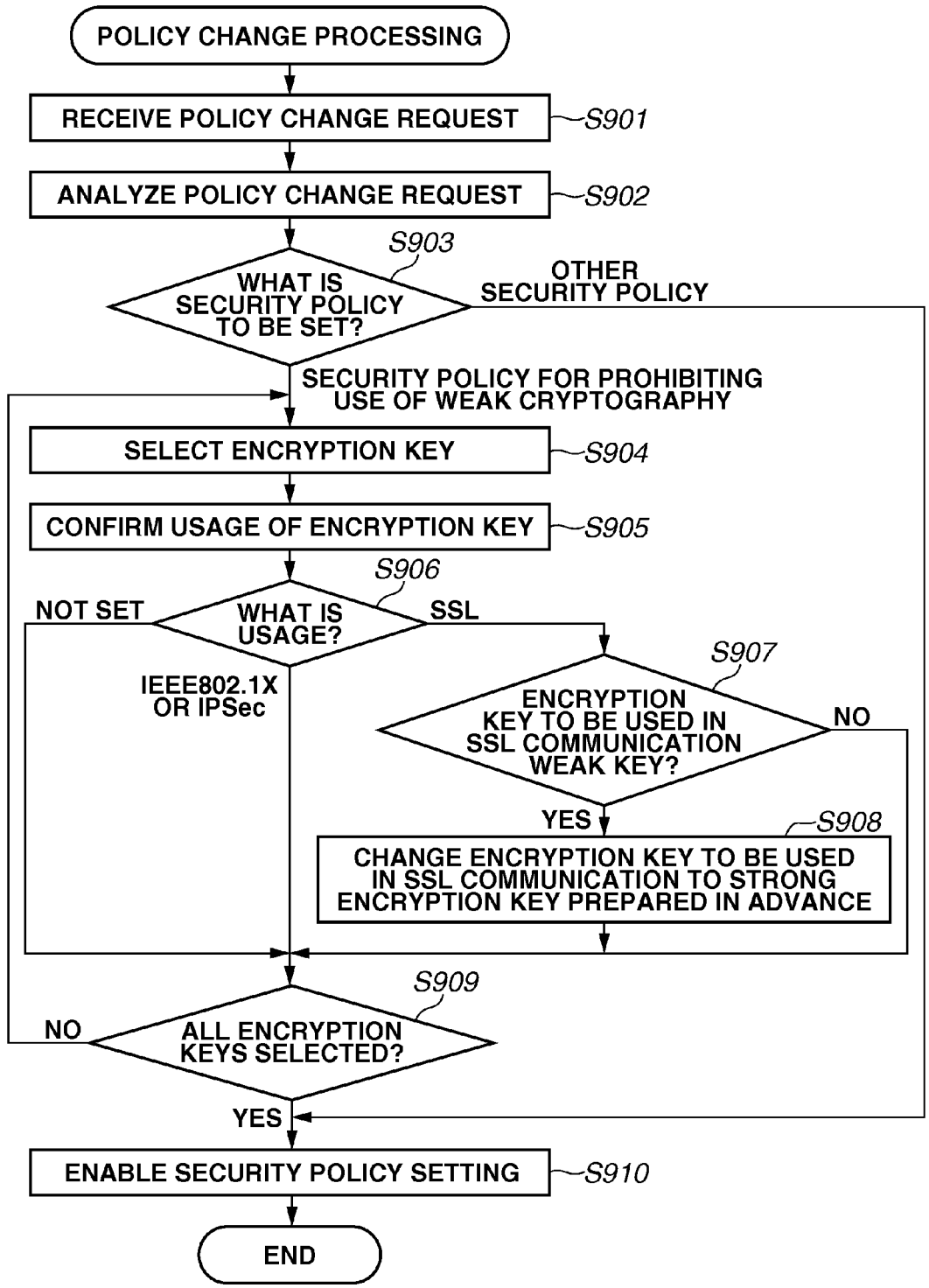
FIG. 9 is a flowchart illustrating a first example of policy change processing.

FIG. 9 is a flowchart illustrating an example of processing (policy change processing) to be executed by the security policy control unit 301 when a policy change request is received.

In step S901, the policy reception unit 311 receives a policy change request. The policy change request is performed by the SSL communication.

Next, in step S902, the policy analysis unit 312 analyzes the policy change request received in step S901.

Next, in step S903, the policy analysis unit 312 determines the security policy to be set from an analyzed result in step S902. As a result of the determination, if the security policy to be set is a security policy other than the security policy for prohibiting use of a weak cryptography, the processing proceeds to step S910 by skipping the processing in steps S904 to S909.

On the other hand, if the security policy to be set is the security policy for prohibiting use of a weak cryptography, the processing proceeds to step S904.

In step S904, the key setting confirmation unit 321 selects an encryption key which has not yet been selected from among all encryption keys set in the image forming apparatus 101 as encryption keys to be used in the encryption communication with an external apparatus.

Next, in step S905, the key setting confirmation unit 321 confirms a usage of the encryption key selected in step S904 (in other words, a protocol to be used in communication of data encrypted by the encryption key).

Figure 10:
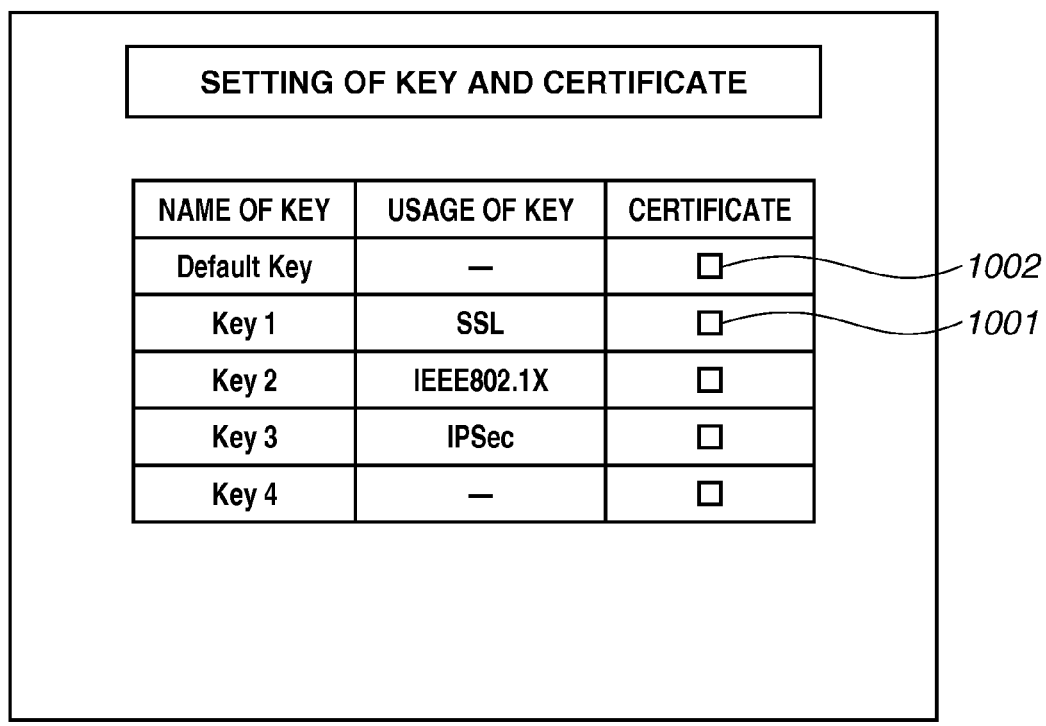
FIG. 10 illustrates a key usage setting screen.

FIG. 10 illustrates an example of a key usage setting screen 1000. The key usage setting screen 1000 is used to set a usage of each encryption key according to the image forming apparatus 101 and displayed on the operation panel 212.

In FIG. 10, a Default Key is an encryption key which is preliminarily installed in the image forming apparatus 101 at the time of shipment from the factory. The Default Key is a strong encryption key having an encryption strength of which use is not prohibited by the security policy for prohibiting use of a weak cryptography. According to the present exemplary embodiment, a user cannot set (change) a usage of the Default Key. As described below, the usage of the Default Key is automatically set to SSL.

In the example shown in FIG. 10, there are encryption keys of Key 1, Key 2, Key 3, and Key 4, and SSL is set to the Key 1, Institute of Electrical and Electronics Engineers (IEEE) 802.1X is set to the Key 2, and Internet protocol security (IPSec) is set to the Key 3 as each usage, respectively. A usage can be set to the Key 4, however, the usage of the Key 4 is not set here.

The key setting confirmation unit 321 confirms, in the above-described step S905, the usage of the encryption key selected in step S904 from the contents set in the key usage setting screen 1000. Next, in step S906, the key setting confirmation unit 321 determines what is the usage of the encryption key selected in step S904.

As a result, if it is determined that the usage of the encryption key selected in step S904 is not set, the processing proceeds to step S909 described below by skipping the processing in steps S907 and S908. In the example shown in FIG. 10, when the encryption key selected in step S904 is the Default Key or the Key 4, it is determined that the usage of the encryption key selected in step S904 is not set.

As described above, the Default Key is the strong encryption key having the encryption strength of which use is not prohibited by the security policy for prohibiting use of a weak cryptography, so that the Default Key is not affected by the security policy. In addition, since the usage is not set to the Key 4, data encrypted using the Key 4 is not communicated at this point. Thus, according to the present exemplary embodiment, when the usage of the encryption key selected in step S904 is not set, special processing associated with a change in the security policy (steps S907 and S908) is not performed.

In addition, as a result of the determination in step S906, if the usage of the encryption key selected in step S904 is IEEE802.1X or IPSec, the processing also proceeds to step S909 described below by skipping the processing in steps S907 and S908. In the example shown in FIG. 10, when the encryption key selected in step S904 is the Key 2 or the Key 3, it is determined that the usage of the encryption key selected in step S904 is IEEE802.1X or IPSec.

In this case, if the security policy for prohibiting use of a weak cryptography is set, the image forming apparatus 101 is prohibited from using the Key 2 or the Key 3, and becomes unable to perform communication in IEEE802.1X or IPSec. However, IEEE802.1X and IPSec are not protocols to be used in the setting of the security policy, so that the communication in IEEE802.1X or IPSec can be restarted by resetting the security policy, for example. For example, in IPSec, a setting is individually performed between the image forming apparatus 101 and an individual external apparatus (the client PC 102 and the like). Therefore, the external apparatus which does not have a setting of IPSec between the image forming apparatus 101 can communicate with the image forming apparatus 101. In addition, if there is no interposition of a local area network (LAN) switch corresponding to IEEE802.1X, the external apparatus can communicate with the image forming apparatus 101. Thus, according to the present exemplary embodiment, when the usage of the encryption key selected in step S904 is IEEE802.1X or IPSec, the special processing associated with the change in the security policy (steps S907 and S908) is not performed.

On the other hand, as a result of the determination in step S906, if the usage of the encryption key selected in step S904 is SSL, the processing proceeds to step S907. In the example shown in FIG. 10, when the encryption key selected in step S904 is the Key 1, it is determined that the usage of the encryption key selected in step S904 is SSL.

In the above descriptions (step S906 in FIG. 9), the usage of the encryption key selected in step S904 is determined.

However, it is acceptable to determine whether the usage of the encryption key selected in step S904 is SSL or not.

In step S907, the key changing unit 322 determines whether the encryption key selected in step S904 (the encryption key to be used in the SSL communication) is a weak encryption key. Here, the weak encryption key means an encryption key using a weak cryptography having a weak encryption strength.

Figure 11:
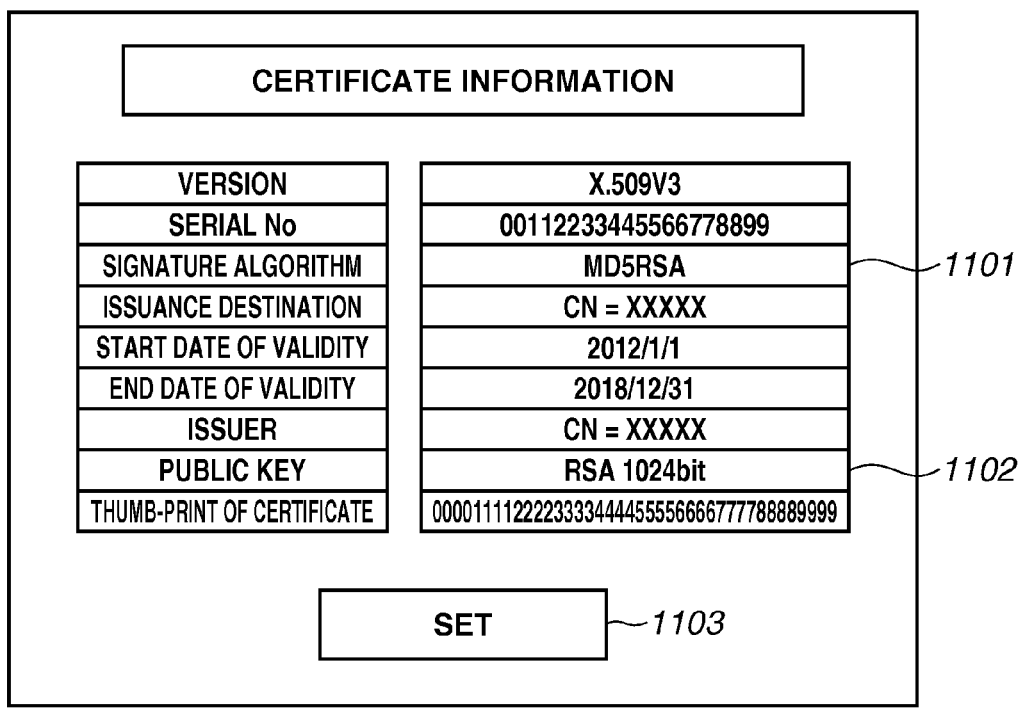
FIG. 11 illustrates a detail screen of a certificate of a Key 1.

Each encryption key is a pair of keys, namely a secret key and a public key. When a button 1001 on the key usage setting screen 1000 shown in FIG. 10 is pressed, a certificate detail display screen for indicating details of a certificate which is information of the public key is displayed. FIG. 11 illustrated an example of a detail screen 1100 of a certificate of the Key 1. As illustrated in FIG. 11, a signature algorithm 1101 and a length of a public key 1102 (key length) are set in the certificate of the Key 1. In FIG. 11, when a setting button 1103 is pressed, contents shown in FIG. 11 are set as the certificate of the Key 1.

FIG. 12 illustrates an example of an encryption key (a cryptography prohibited from being used) which is prohibited from being used by the security policy for prohibiting use of a weak cryptography.

An encryption strength means ease of breaking a cryptography and difficulty in decryption. The higher the encryption strength becomes, the more difficult breaking of the cryptography and decryption of the data become. The encryption strength varies according to an encryption method and a key length, and it can be said that a cryptography using an encryption key having a higher encryption strength is a safer cryptography. The example in FIG. 12 shows that an encryption key in which a key length of Rivest-Shamir-Adleman (RSA)/digital signature algorithm (DSA)/Diffie-Hellman (DH) is 1024 bits or less is prohibited from being used as a public key cryptography in the SSL communication. Therefore, in RSA/DSA/DH, a public key of which key length is 512 bits or 1024 bits cannot be used and a public key of which key length is 2048 bits or 4096 bits needs to be used. Here, a case when a cryptography which is prohibited from being used in the SSL communication is determined according to the safety standard provided in National Institute of Standards and Technology (NIST) SP800-57 is described as an example. However, a definition of a cryptography to be prohibited from being used in the SSL communication may be added by regarding that it cannot be used in the SSL communication unless it is a further stronger cryptography.

As an example of specific processing in step S907, first, the key changing unit 322 analyzes the encryption key selected in step S904 (the encryption key to be used in the SSL communication). Then, the key changing unit 322 determines whether at least either one of a signature algorithm of the encryption key and a key length of the encryption key (the public key) falls into the one which is prohibited to be used in the above-described SSL communication. The determination can be realized by, for example, incorporating the encryption key prohibited from being used in the SSL communication into a determination logic, or comparing with a list 1200 shown in FIG. 12. As a result of the determination, if at least either one of the signature algorithm of the encryption key and the key length of the encryption key (the public key) is the one which is prohibited to be used in the above-described SSL communication, the relevant encryption key (the encryption key to be used in the SSL communication) is determined as the weak encryption key. In the example shown in FIG. 11, the signature algorithm 1101 of the Key 1 to be used in the SSL communication is message digest algorithm 5 (MD5), and a 1024-bit RSA key is used as the public key of the Key 1. Thus, the Key 1 is determined as the weak encryption key from the list 1200 shown in FIG. 12, for example.

As a result of the determination in step S907, if it is determined that the encryption key selected in step S904 (the encryption key to be used in the SSL communication) is not the weak encryption key (NO in step S907), the processing proceeds to step S909 described below by skipping the processing in step S908. On the other hand, if it is determined that the encryption key selected in step S904 (the encryption key to be used in the SSL communication) is the weak encryption key (YES in step S907), the processing proceeds to step S908.

As described above, according to the present exemplary embodiment, the SSL communication is performed for setting of the security policy. Therefore, if use of the encryption key to be used in the SSL communication is prohibited, the image forming apparatus 101 becomes unable to perform the SSL communication and to set the security policy. Thus, according to the present exemplary embodiment, in step S908, the key changing unit 322 changes the encryption key selected in step S904 (the encryption key to be used in the SSL communication) to a strong encryption key (Default Key) which is prepared in advance as an encryption key for SSL. Then, the processing proceeds to step S909.

Figure 13:
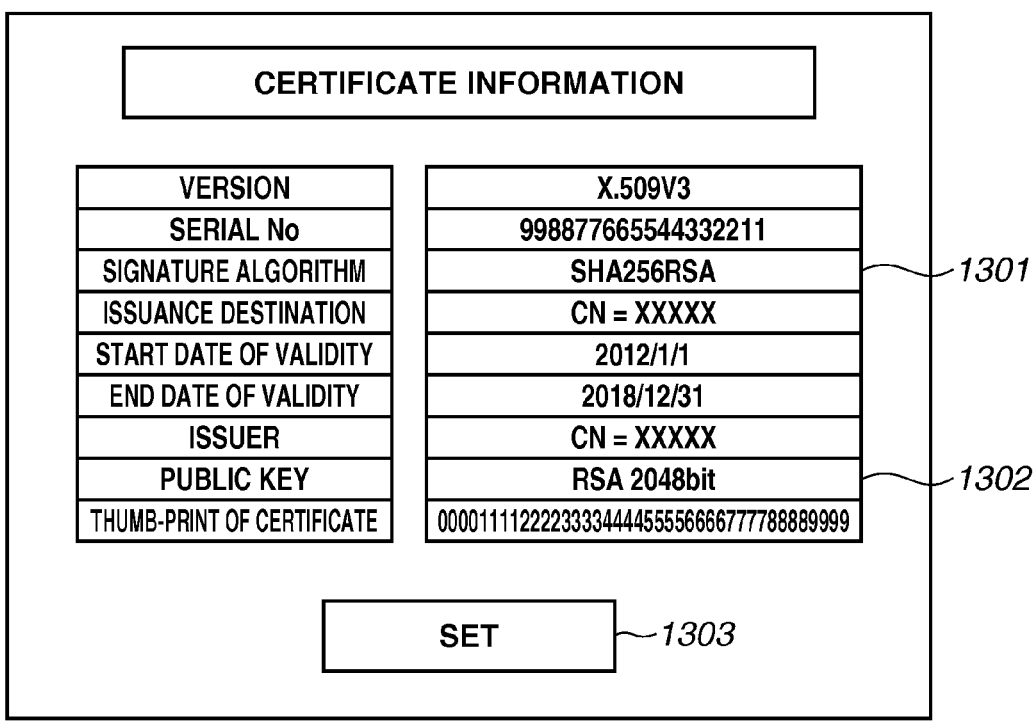
FIG. 13 illustrates a detail screen of a certificate of a Default Key.

FIG. 13 illustrates an example of a detail screen 1300 of a certificate of the Default Key. The detail screen 1300 of the certificate of the Default Key is displayed when a button 1002 on the key usage setting screen 1000 shown in FIG. 10 is pressed.

As shown in FIG. 13, a signature algorithm 1301 of the Default Key is secure hash algorithm 256 (SHA256), and a 2048-bit RSA key is used as the public key of the Default Key. Therefore, the Default Key does not correspond to the encryption key which is prohibited from being used by the security policy for prohibiting use of a weak cryptography based on the list in FIG. 12. Such Default Key is prepared in advance in the image forming apparatus 101. In FIG. 13, the contents shown in FIG. 13 are set as the certificate of the Default Key by pressing a setting button 1303.

Returning to the descriptions of FIG. 9, when the processing proceeds to step S909 as described above, the key setting confirmation unit 321 determines whether all of the encryption keys set in the image forming apparatus 101 as the encryption keys to be used in communication with the external apparatus are selected. As a result of the determination, if all of the encryption keys are not selected (NO in step S909), the processing returns to step S904. Then, a usage of the encryption key which has not yet been selected is determined, and if needed, necessity of changing the encryption key is determined and the encryption key is changed. When all of the encryption keys are selected as described above, the processing proceeds to step S910.

Then, in step S910, the policy setting unit 313 enables the setting of the security policy which is requested to be set by the policy change request received in step S901 based on the analysis result in step S902. If the security policy requested to be set is the security policy for prohibiting use of a weak cryptography, the image forming apparatus 101 becomes unable to perform communication using a weak cryptography when the setting of the security policy is enabled. Then, the policy setting unit 313 transmits to the client PC 102 the policy change result notification indicating that the setting of the security policy which is requested to be set by the policy change request received in step S901 is enabled.

Next, an example of processing is described which is executed in the image forming apparatus 101 when a usage of the encryption key set in the image forming apparatus 101 is changed.

FIG. 14 illustrates an example of an SSL key setting screen 1400 for setting the encryption key to be used in the SSL communication.

In the example shown in FIG. 14, it is assumed that the encryption key to be used in SSL is currently changed from the Key 1 to the Default Key (see step S908 in FIG. 9). In this state, it is assumed that a user performs an operation to change the usage of the Key 1 to SSL by selecting a radio button 1401 and presses a setting button 1402. The Key 1 is a weak key as described based on FIG. 11. Thus, SSL cannot be set to the usage of the Key 1 since the setting of the security policy for prohibiting use of a weak encryption key is valid. Therefore, the security policy control unit 301 displays a message such as "The usage of the key cannot be set since the use of a weak cryptography is restricted by the security policy" on the operation panel 212 as shown in a setting failure notification screen 1500 illustrated in FIG. 15.

Figure 16:
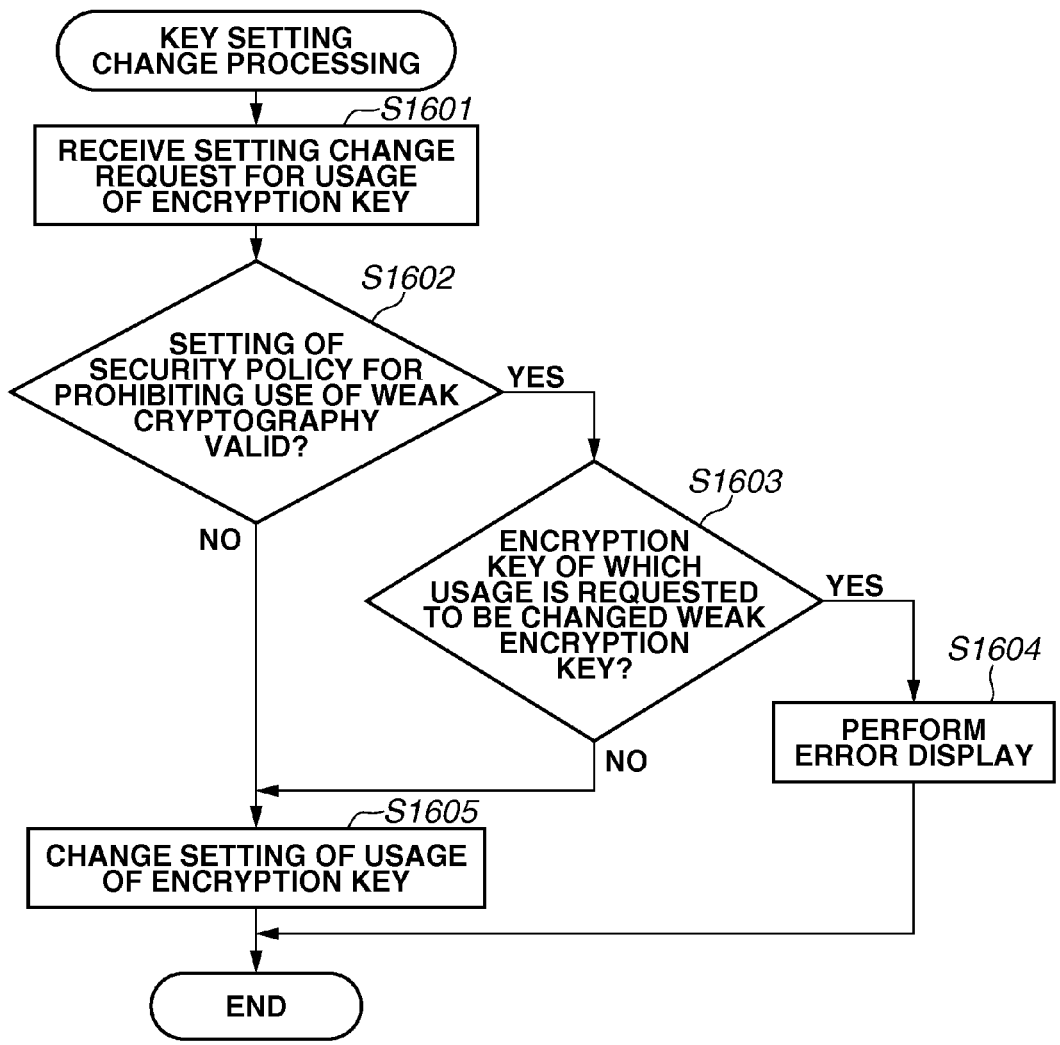
FIG. 16 is a flowchart illustrating key setting processing.

Next, an example of processing (key setting processing) to be executed by the security policy control unit 301 when a change in the usage of the encryption key is requested is described by referring to a flowchart illustrated in FIG. 16.

First, in step S1601, the policy setting unit 313 receives a change request for the usage of the encryption key within the image forming apparatus 101. The change request is issued by, for example, pressing the setting button 1402 on the SSL key setting screen 1400, and contents thereof correspond to those of a change operation to the SSL key setting screen 1400 when the setting button 1402 is pressed.

Next, in step S1602, the policy setting unit 313 determines whether the setting of the security policy for prohibiting use of a weak cryptography is valid (ON). As a result of the determination, if the setting of the security policy for prohibiting use of a weak cryptography is not valid (ON) (NO in step S1602), a change in the usage of the encryption key is not restricted, and the processing proceeds to step S1605. Then, in step S1605, the key changing unit 322 reflects (sets) the contents of the change operation to the setting of the usage of the encryption key (the change operation to the SSL key setting screen 1400) according to the contents of the change request received in step S1601.

On the other hand, if the setting of the security policy for prohibiting use of a weak cryptography is valid (ON) (YES in step S1602), then, in step S1603, the key changing unit 322 determines whether the encryption key of which usage corresponds to the one requested to be changed is the weak encryption key. The determination in step S1603 can be realized by the same method performed in step S907 in FIG. 9, for example, so that the detail descriptions thereof are omitted here.

As a result of the determination, if the encryption key of which usage corresponds to the one requested to be changed is not the weak encryption key (NO in step S1603), a change in the usage of the encryption key is not against the security policy for prohibiting use of a weak cryptography. Thus, the processing proceeds to step S1605. Then, in step S1605, the key changing unit 322 changes the usage of the encryption key as described above.

On the other hand, if the encryption key of which usage corresponds to the one requested to be changed is the weak encryption key (YES in step S1603), the change in the usage of the encryption key is against the security policy for prohibiting use of a weak cryptography. Thus, the processing proceeds to step S1604. In step S1604, the key changing unit 322 displays a message screen (the setting failure notification screen 1500 illustrated in FIG. 15) indicating that the usage of the encryption key cannot be changed since the use of a weak cryptography is restricted by the security policy.

Next, processing executed at the time of SSL connection is described.

Figure 17:
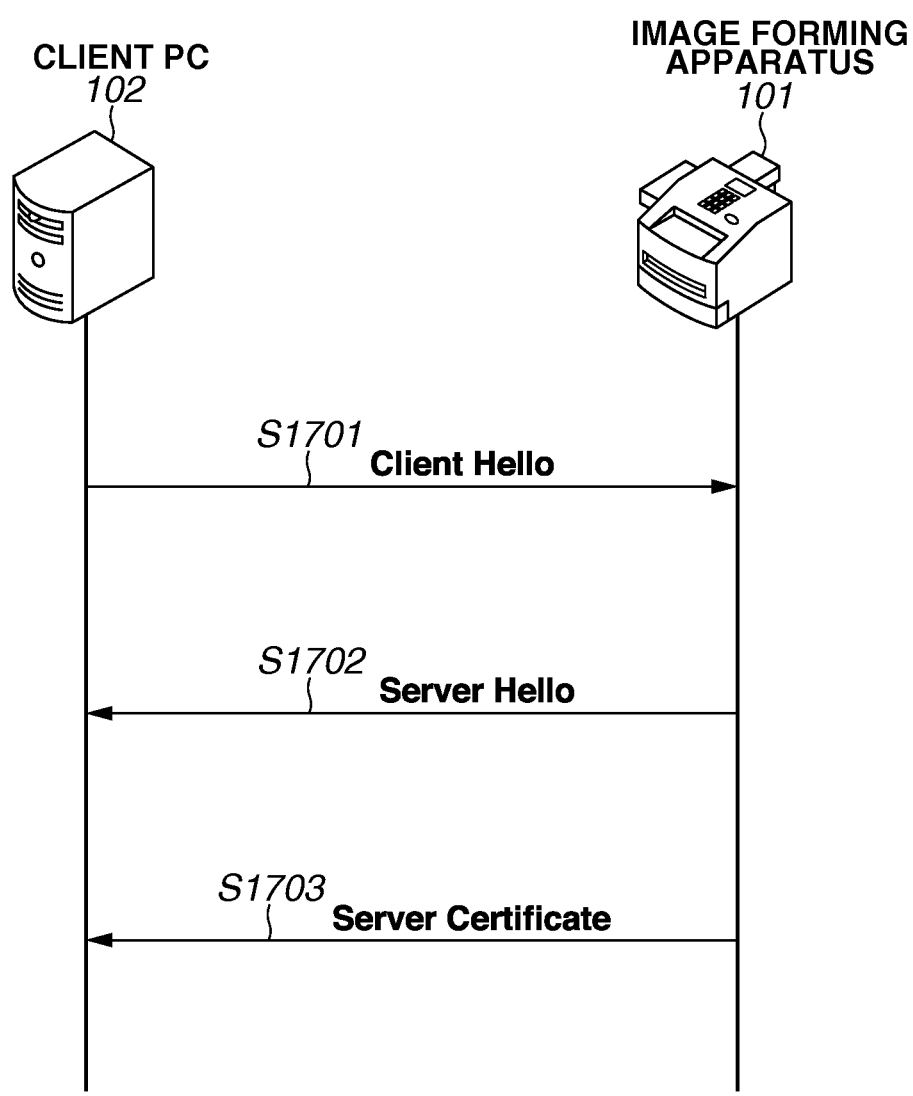
FIG. 17 illustrates processing executed at the time of SSL connection.

FIG. 17 is a sequence diagram illustrating an example of processing to be executed by the client PC 102 and the image forming apparatus 101 at the time of SSL connection.

In step S1701, the client PC 102 transmits a ClientHello message to the image forming apparatus 101. In step S1702, the image forming apparatus 101 transmits a ServerHello message to the client PC 102 as a response thereto. Then, in step S1703, the image forming apparatus 101 transmits a certificate of its own to the client PC 102 when transmitting a ServerCertificate message.

Figure 18:
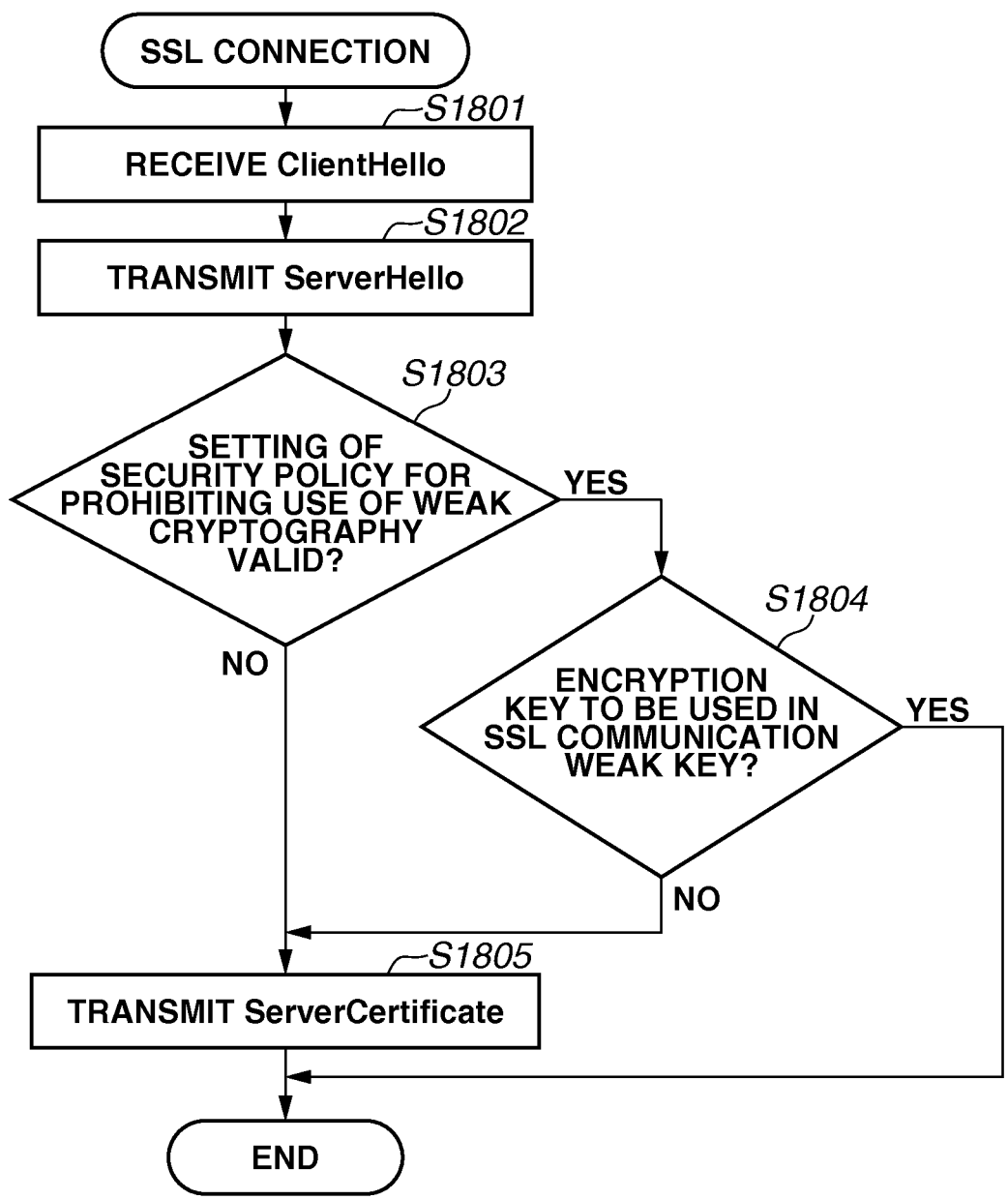
FIG. 18 is a flowchart illustrating SSL connection processing.

FIG. 18 is a flowchart illustrating an example of processing to be executed by the image forming apparatus 101 at the time of the SSL connection.

In step S1801, first, the image forming apparatus 101 receives the ClientHello message from the client PC 102. When receiving the ClientHello message, in step S1802, the image forming apparatus 101 transmits the ServerHello message to the client PC 102.

Then, in step S1803, the image forming apparatus 101 determines whether the setting of the security policy for prohibiting use of a weak cryptography is valid (ON). As a result of the determination, if the setting of the security policy for prohibiting use of a weak cryptography is not valid (ON) (NO in step S1803), the SSL communication is not affected by the security policy, and the SSL communication can be performed. Thus, in step S1805, the image forming apparatus 101 transmits the ServerCertificate message to the client PC 102.

On the other hand, if the setting of the security policy for prohibiting use of a weak cryptography is valid (ON) (YES in step S1803), then, in step S1804, the image forming apparatus 101 determines whether the encryption key to be used in the SSL communication is a weak key. The determination in step S1804 can be realized by the same method performed in step S907 in FIG. 9, for example, so that the detail descriptions thereof are omitted here.

As a result of the determination, if the encryption key to be used in the SSL communication is not a weak key (NO in step S1804), the relevant encryption key is not against the security policy for prohibiting use of a weak cryptography. Thus, in step S1805, the image forming apparatus 101 transmits the ServerCertificate message to the client PC 102.

On the other hand, if the encryption key to be used in the SSL communication is a weak key (YES in step S1804), the SSL communication using the relevant encryption key is against the security policy for prohibiting use of a weak cryptography. Therefore, the image forming apparatus 101 does not transmit the ServerCertificate message, and the certificate of the image forming apparatus 101 is not transmitted to the client PC 102. As a result, the processing is timed out, and the client PC 102 fails in the SSL connection to the image forming apparatus 101.

As described above, according to the present exemplary embodiment, when SSL is set as the usage of the weak encryption key, the encryption key to be used in the SSL communication is changed to the Default Key. However, the Default Key is a self-signed certificate which the image forming apparatus 101 has in advance, and is not certified by a certificate authority. Therefore, according to the present exemplary embodiment, when the SSL connection is performed from the client PC 102 to the image forming apparatus 101, a using key confirmation screen 1900 illustrated in FIG. 19 is displayed. The using key confirmation screen 1900 is a screen for causing a user to confirm whether to continue the SSL communication using the Default Key.

In the example shown in FIG. 19, messages indicating that the encryption key to be used in the SSL communication is not certified by a certificate authority is displayed on the using key confirmation screen 1900. When allowing the SSL communication using the Default Key to continue, a user presses a button 1901. On the other hand, when not allowing the SSL communication using the Default Key to continue, the user presses a button 1902. Further, when confirming details of the Default Key, the user presses a button 1903. When the button 1903 is pressed, the certificate detail display screen indicating the details of the Default Key is displayed. The certificate detail display screen displays, for example, information about the signature algorithm, a length of the public key (a key length), and the like.

According to the present exemplary embodiment, for the sake of preventing the SSL communication from being disabled by application of the security policy for prohibiting use of a weak cryptography, the using key confirmation screen 1900 is displayed after the encryption key to be used in the SSL communication is temporarily changed to the Default Key. Thus, a user (a security administrator) can reconsider an operation such as introducing a new encryption key. For example, the Default Key can be changed to a strong encryption key (i.e., a new encryption key) which is the new encryption key certified by a certificate authority and has an encryption strength not prohibited by the security policy.

The using key confirmation screen 1900 in FIG. 19 is displayed by the client PC 102 after the processing in step S1805, for example. Then, when the button 1901 is pressed, the client PC 102 continues the SSL communication with the image forming apparatus 101. On the other hand, when the button 1902 is pressed, the client PC 102 terminates the SSL communication with the image forming apparatus 101.

However, the above-described operations are not necessarily required. For example, when it is determined that the encryption key to be used in the SSL communication is not a weak key in step S1804, the image forming apparatus 101 can display the using key confirmation screen 1900 before advancing the processing to step S1805. Then, when the button 1901 is pressed, the image forming apparatus 101 advances the processing to step S1805. On the other hand, when the button 1902 is pressed, the image forming apparatus 101 terminates the processing according to the flowchart in FIG. 18.

As described-above, according to the present exemplary embodiment, after the security policy for prohibiting use of a weak cryptography is delivered from the client PC 102, each of the encryption keys set in the image forming apparatus 101 is individually determined whether it is the weak encryption key or not. Accordingly, the encryption communication by a protocol set as a usage of the weak encryption key is prevented from being performed. Therefore, the security policy for prohibiting use of a weak cryptography can be appropriately applied to the image forming apparatus.

In addition, according to the present exemplary embodiment, if SSL is set as a usage of the weak encryption key, the weak encryption key is changed to a strong encryption key having an encryption strength of which use is not prohibited by the security policy. Therefore, if use of the encryption key used in SSL is prohibited by the security policy, the encryption communication in SSL can be continued. Thus, it can suppress a case that the security policy cannot be reset.

According to the present exemplary embodiment, performing the SSL communication to set the security policy is described as an example. However, a protocol to be used for setting the security policy is not limited to SSL, and it can be a predetermined protocol other than the protocol to be used for setting the security policy.

Further, according to the present exemplary embodiment, the case that a weak encryption key in which a protocol (SSL) to be used for setting the security policy is set as the usage thereof is changed to a strong encryption key is described as an example. However, an encryption key in which a protocol other than the protocol used for setting the security policy is set as the usage thereof can also be changed to the strong encryption key (Default Key), if the encryption key is the weak encryption key (the encryption key shown FIG. 12), Further, according to the present exemplary embodiment, the case that a security policy is the security policy for prohibiting use of a weak cryptography is described as an example. However, in the relevant security policy, specific contents of a weak cryptography may be identified (an encryption key prohibited from being used may be identified specifically).

Further, according to the present exemplary embodiment, in the case where the usage of the weak encryption key is changed when the security policy for prohibiting use of a weak cryptography is valid, the change is not allowed. However, the weak encryption key may be changed to a strong encryption key (Default Key).

Furthermore, according to the present exemplary embodiment, in the case where SSL is set as the usage of the weak encryption key when the security policy for prohibiting use of a weak cryptography is delivered, the weak encryption key is changed to a strong encryption key having an encryption strength which is not against the security policy. However, such a change in the encryption key does not have to be performed immediately after the delivery of the security policy for prohibiting use of a weak cryptography. In such a case, as shown in FIG. 18, the encryption key to be used in the SSL communication at the time of the SSL connection is determined whether a weak key. Then, if the encryption key to be used in the SSL communication at the time of the SSL connection is a weak key, the image forming apparatus 101 does not transmit the ServerCertificate message.

In addition, when communication is performed by a protocol other than SSL, it is determined whether the setting of the security policy for prohibiting use of a weak cryptography is valid. When it is valid, an encryption key to be used by the relevant protocol can be determined whether a weak encryption key or not. As a result of the determination, if the encryption key to be used by the relevant protocol is the weak encryption key, communication using the relevant protocol is not performed.

Next, a second exemplary embodiment is described below.

According to the first exemplary embodiment, the case is described as an example in which if an encryption key to be used in the SSL communication is a weak encryption key when the security policy for prohibiting use of a weak cryptography is applied, the encryption key is changed to a strong encryption key prepared in advance. By contrast, according to the present exemplary embodiment, in such a case, a strong encryption key is self-generated and the weak encryption key is changed to the generated encryption key instead of changed to the encryption key prepared in advance. As described above, the present exemplary embodiment is different from the first exemplary embodiment mainly in a method for obtaining an encryption key which replaces another encryption key when the another encryption key to be used in the SSL communication is a weak encryption key. Therefore, in the descriptions according to the present exemplary embodiment, the same reference numerals in FIG. 1 to FIG. 19 are allocated to the parts identical to the first exemplary embodiment, and detail descriptions thereof are omitted.

FIG. 20 is a block diagram illustrating an example of a software configuration of the image forming apparatus 101.

A difference from the software configuration of the image forming apparatus 101 described in the first exemplary embodiment is that a key generation unit 323 is installed in the key control unit 302 instead of the key changing unit 322 illustrated in FIG. 3. As described above, according to the present exemplary embodiment, the configuration is different because the weak encryption key is not changed to a strong encryption key prepared in advance, but a strong encryption key to replace the weak encryption key is generated.

FIG. 21 is a flowchart illustrating an example of processing (policy change processing) to be executed by the security policy control unit 301 when a policy change request is received.

A difference from the policy change processing described in the first exemplary embodiment is that the processing in step S2101 is performed instead of the processing in step S908 in FIG. 9. More specifically, in step S2101, the key generation unit 323 generates a strong encryption key having an encryption strength of which use is not prohibited by the security policy, and changes the encryption key selected in step S904 (the encryption key to be used in the SSL communication) to the generated encryption key.

The strong encryption key generated in step S2012 is an encryption key having an encryption strength which is higher than, for example, the one defined in FIG. 12. For example, an encryption key same as the encryption key shown in FIG. 13 may be fixedly generated, and an encryption key to be generated may be changed according to an encryption type (an encryption algorithm) supported by the image forming apparatus 101. Changing an encryption key to be generated according to an encryption type supported by the image forming apparatus 101 means as follows, for example. More specifically, in the case of an apparatus which supports only to 2048-bit RSA as a public key algorithm, for example, a 2048-bit RSA key is generated. In the case of an apparatus which supports an elliptic curve cryptography, for example, a key for an elliptic curve digital signature algorithm (ECDSA) with curve P-256 is generated. Thus, a strongest key can be generated by determining an encryption key to be generated according to the encryption type supported by the image forming apparatus 101.

As described above, the effect described in the first exemplary embodiment can be obtained by generating a strong encryption key having an encryption strength of which use is not prohibited by the security policy.

In addition to the above, the present exemplary embodiment can also employ various modifications described in the first exemplary embodiment.

Next, a third exemplary embodiment of the present invention is described. According to the first and the second exemplary embodiments, the case that a user accesses the image forming apparatus 101 from the browser screen of the client PC 102 to individually set the security policies in the image forming apparatus 101 is described as an example. By contrast, according to the present exemplary embodiment, a case is described in which settings (setting values) of the devices in the image forming apparatus 101 are collectively exported, and settings (setting values) of the devices in the image forming apparatus 101 are collectively imported. The settings which are collectively exported and/or imported include a setting of the security policy and settings of various devices including key data. As described above, the present exemplary embodiment is different from the first and the second exemplary embodiments mainly in a configuration and processing regarding settings of the devices in the image forming apparatus 101. Therefore, in the descriptions according to the present exemplary embodiment, the same reference numerals in FIG. 1 to FIG. 21 are allocated to the parts identical to the first and the second exemplary embodiments, and detail descriptions thereof are omitted.

FIG. 22 is a block diagram illustrating an example of a software configuration of the image forming apparatus 101.

Differences from the software configuration of the image forming apparatus 101 described in the first exemplary embodiment are that a key reception unit 324 and a key analysis unit 325 are installed in the key control unit 302, and a batch setting control unit 303 is installed in the image forming apparatus 101.

The batch setting control unit 303 is realized by, for example, using a software program for performing control to collectively import and/or export settings of the devices in the image forming apparatus 101.

A batch import request reception unit 331 receives a request for collectively importing the settings of the devices in the image forming apparatus 101. In the following descriptions, a request for collectively importing the settings of the devices in the image forming apparatus 101 is referred to as a batch import request as necessary.

A batch export request reception unit 332 receives a request for collectively exporting the settings of the devices in the image forming apparatus 101. In the following descriptions, a request for collectively exporting the settings of the devices in the image forming apparatus 101 is referred to as a batch export request as necessary.

A batch setting data generation unit 333 generates data pieces which are collectively exported and/or imported. In the following descriptions, data which is collectively exported and/or imported is referred to as batch setting data as necessary.

A batch setting data analysis unit 334 analyzes batch setting data.

A batch setting data encryption processing unit 335 encrypts and decrypts batch setting data.

A batch setting data reflection unit 336 reflects batch setting data in the appropriate device.

The key reception unit 324 receives a key.

The key analysis unit 325 analyzes the key received by the key reception unit 324.

Software programs for realizing the security policy control unit 301, the key control unit 302, and the batch setting control unit 303 are stored in the ROM 202, for example. The CPU 201 develops the software program to the RAM 203 and executes it when controlling the image forming apparatus 101.

FIG. 23 is a sequence diagram illustrating an example of processing to be executed when the settings of the devices in the image forming apparatus 101 are collectively exported. In the following descriptions, collectively exporting the settings of the devices in the image forming apparatus 101 is referred to as batch export, and collectively importing the settings of the devices in the image forming apparatus 101 is referred to as batch import, as necessary.

Figure 24:
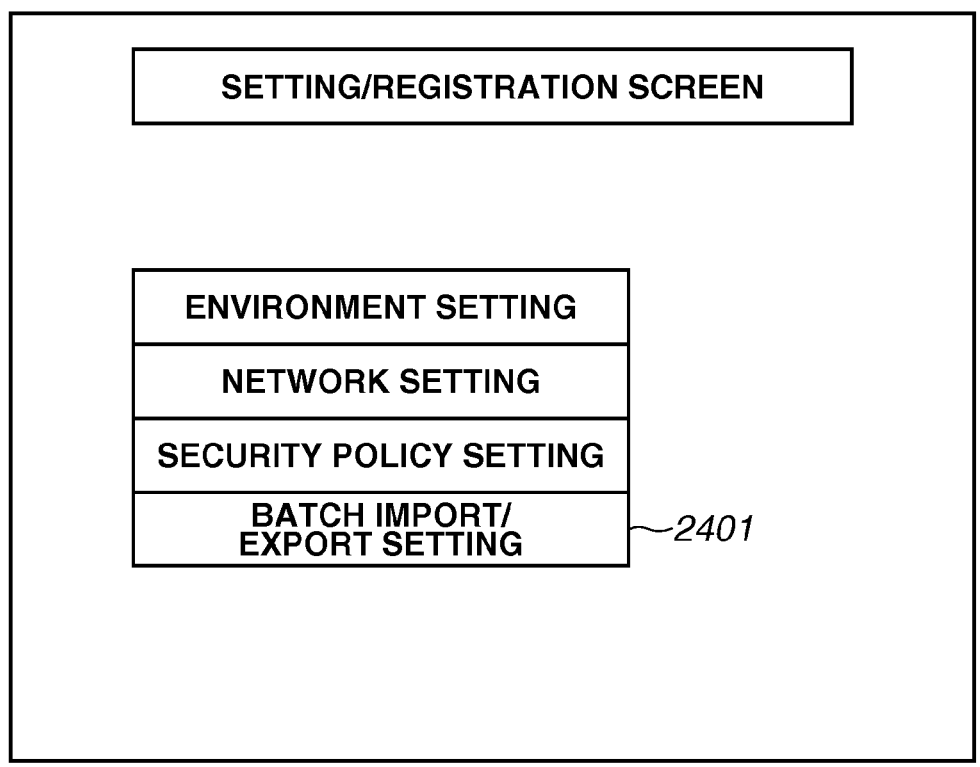
FIG. 24 illustrates a setting registration screen.

First, the client PC 102 starts up a browser. When a URL of the image forming apparatus 101 is input to the URL entry field of the browser, the login screen 500 illustrated in FIG. 5 is displayed on the browser screen. When a user ID and a password are input to the login screen 500 and login is successful, the browser screen is shifted from the login screen 500 to a setting registration screen 2400 illustrated in FIG. 24. The setting registration screen 2400 is configured by adding a batch import/export setting button 2401 to the setting registration screen 600 illustrated in FIG. 6.

A user presses the batch import/export setting button 2401 on the setting registration screen 2400. Doing so, the browser screen is shifted from the setting registration screen 2400 to a batch import/export screen 2500 illustrated in FIG. 25. When batch import is performed, a user presses an import button 2501 on the batch import/export screen 2500. Accordingly, the browser screen is shifted from the batch import/export screen 2500 to a screen for performing batch import (see FIGS. 31A, 31B, and the like). On the other hand, when batch export is performed, a user presses an export button 2502 on the batch import/export screen 2500. Accordingly, the browser screen is shifted from the batch import/export screen 2500 to a screen for performing batch export (see FIGS. 26A, 26B, and the like).

Figure 26A:
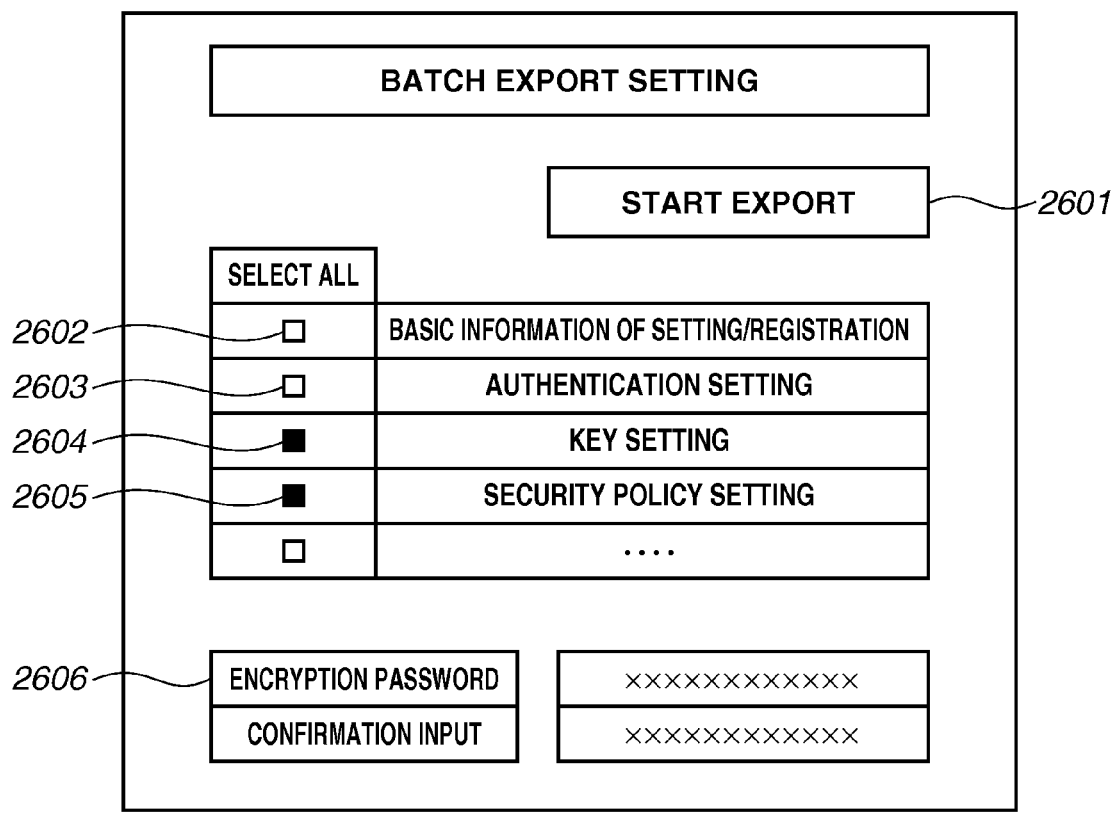
FIG. 26A illustrates a batch export setting screen.
Figure 26B:
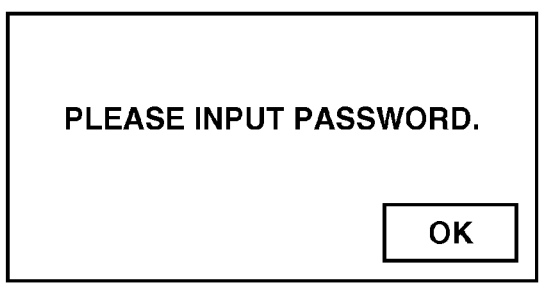
FIG. 26B illustrates a password input screen.

FIG. 26A illustrates an example of a batch export setting screen 2600 for selecting a setting subjected to the batch export, and FIG. 26B illustrates an example of a password input screen 2610.

In the example shown in FIG. 26A, basic information of setting/registration 2602, an authentication setting 2603, a key setting 2604, and a security policy setting 2605 are indicated as settings to be targets of selection. However, the settings subjected to batch export are not limited to the above examples, and other settings can be selected as settings subjected to the batch export A user selects the settings to be exported, inputs an encryption password to an encryption password entry field 2606, and then presses an export start button 2601. Accordingly, in step S2301, the client PC 102 transmits a batch export request to the image forming apparatus 101. By this operation, processing for performing batch export is started. As described above, according to the present exemplary embodiment, a target of batch export can be selected like, for example, only the setting of the security policy, only key data, or both of the setting of the security policy and the key data.

When the export start button 2601 is pressed in a state that an encryption password is not yet input in the encryption password entry field 2606, the password input screen 2610 (see FIG. 26B) for prompting a user to input a password is displayed. When the batch export is completed, in step S2302, the image forming apparatus 101 notifies the client PC 102 of completion of the batch export. In FIG. 23, a notification indicating a result of batch export is expressed as a batch export result notification FIG. 27 is an example of batch setting data 2700.

According to the present exemplary embodiment, batch setting data is composed of extensible markup language (XML) format data.

In FIG. 27, a line 2701 indicates data for setting a security policy.

A line 2702 indicates a setting of the security policy for prohibiting use of a weak cryptography. The example shown in FIG. 27 indicates only one setting of the security policy. However, settings of a plurality of security policies can be included in the batch setting data 2700.

A line 2703 indicates that the security policy indicated in the line 2702 is ON (valid).

A line 2704 indicates data for a key setting.

A line 2705 indicates a key setting for a first key, and a line 2708 indicates a key setting for a second key.

A line 2706 indicates a name of the key and its usage. In this example, the line 2706 indicates that a key is a Key 1 to be used in SSL communication.

A line 2707 indicates key data. According to the present exemplary embodiment, a content of the key data is expressed by a binary string. The key data is encrypted before being exported. Therefore, a third party cannot know the contents of the exported key data.

Figure 28A:
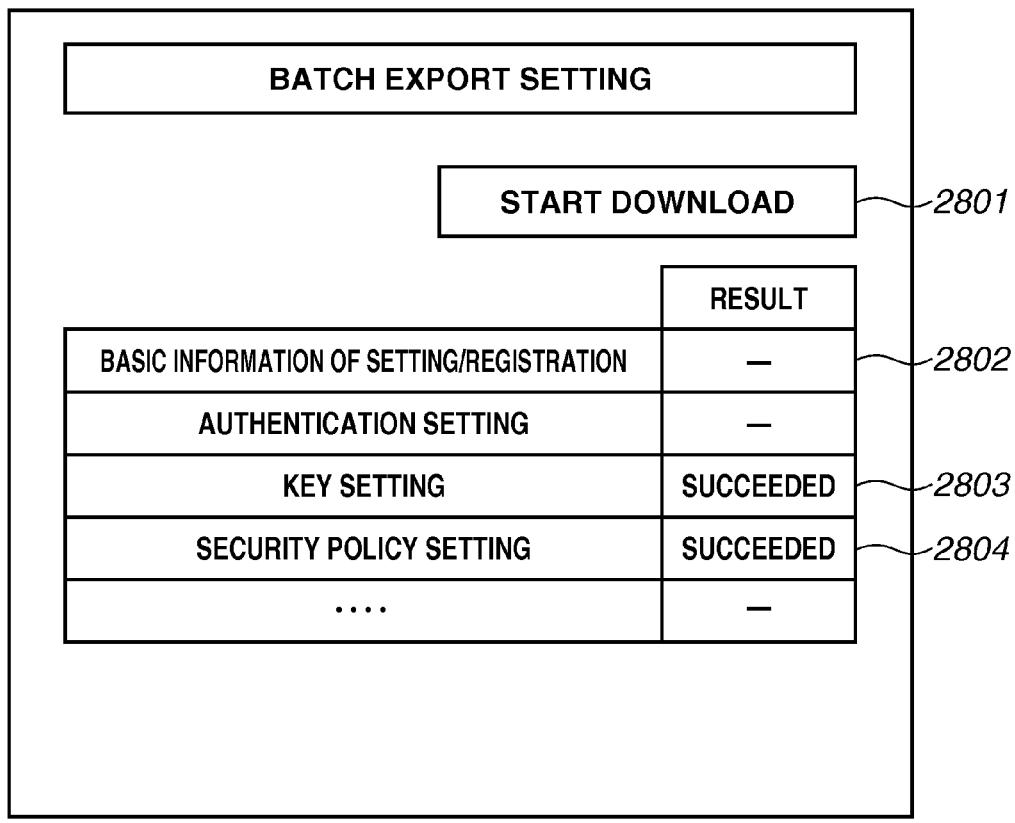
FIG. 28A illustrates a batch export result screen.
Figure 28B:
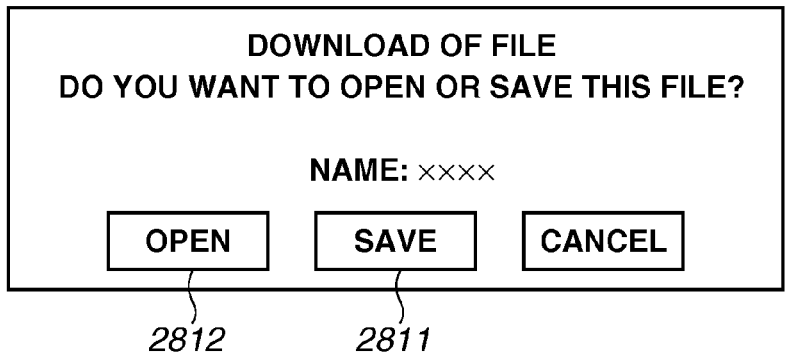
FIG. 28B illustrates a file saving screen.

FIG. 28A illustrates an example of a batch export result screen 2800 indicating a result of batch export, and FIG. 28B illustrates an example of a file saving screen 2810.

In the example shown in FIG. 28A, a result of each setting in the batch export is displayed. Further, regarding a setting which is not a target of the batch export, the result of the batch export is displayed as "-" as shown in a result field 2802. On the other hand, regarding a setting which is successful in the batch export, the result of the batch export is displayed as "succeeded" as shown in result fields 2803 and 2804. In addition, a result of a setting which failed in the batch export is displayed as "failed".

When batch setting data is obtained, a user presses a download start button 2801. In response, the file saving screen 2810 is displayed. If a user presses a save button 2811 on the file saving screen 2810, the user can save a batch setting data file in an arbitrary location. Further, if a user presses an open button 2812 on the file saving screen 2810, the user can open a batch setting data file.

Figure 29:
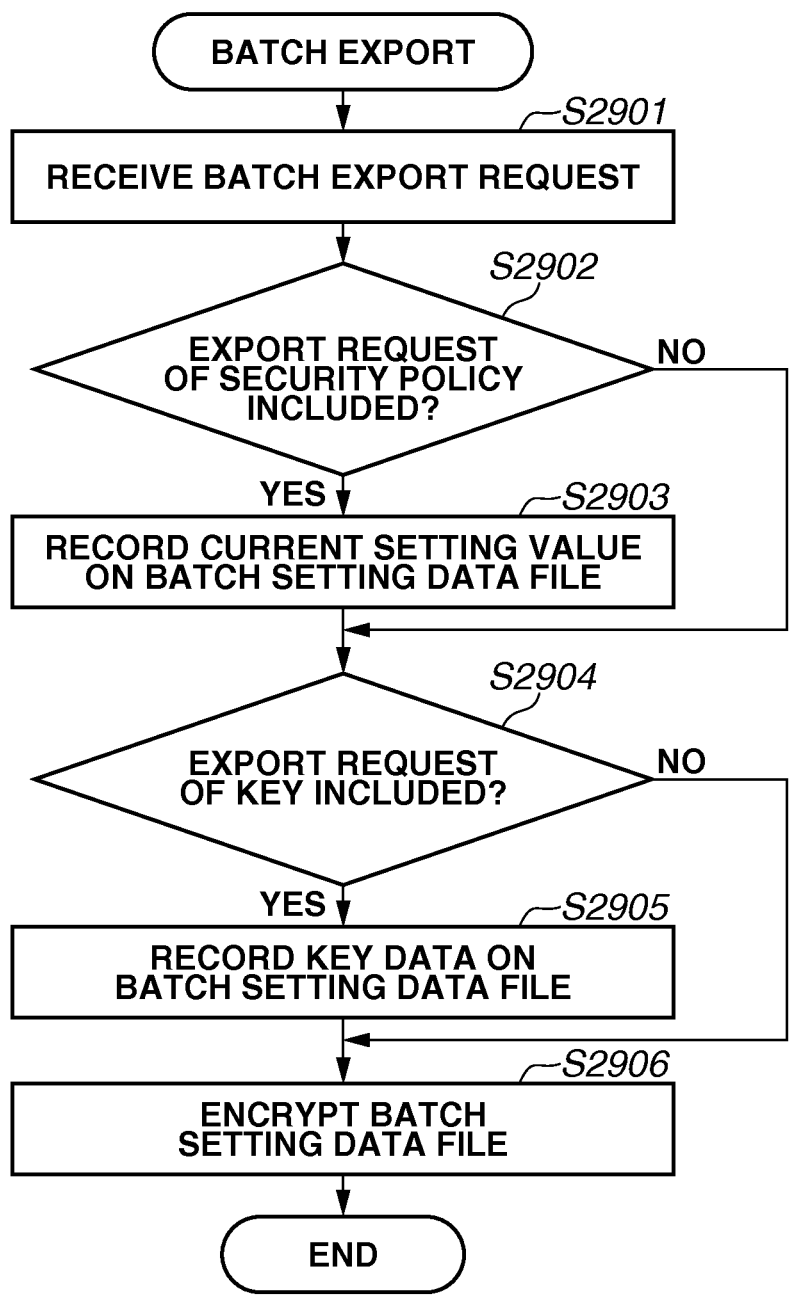
FIG. 29 is a flowchart illustrating processing executed when a batch export request is received.

FIG. 29 is a flowchart illustrating an example of processing to be executed by the batch setting control unit 303 when a batch export request is received.

In step S2901, the batch export request reception unit 332 receives a batch export request.

Next, the batch setting data generation unit 333 generates batch setting data. A specific example of processing for generating batch setting data is described below.

In step S2902, the batch setting data generation unit 333 determines whether a request for export of the security policy is included in the batch export request. As a result of the determination, if the export request of the security policy is included (YES in step S2902), then, in step S2903, the batch setting data generation unit 333 records a current setting value of the security policy in the batch setting data file. Then, the processing proceeds to step S2904. On the other hand, if the export request of the security policy is not included (NO in step S2902), the processing proceeds to step S2904 by skipping the processing in step S2903.

When the processing proceeds to step S2904, the batch setting data generation unit 333 determines whether a request for export of a key is included in the batch export request. As a result of the determination, if the export request of the key is included (YES in step S2904), then, in step S2905, the batch setting data generation unit 333 records key data in the batch setting data file. Then, the processing proceeds to step S2906. On the other hand, if the export request of the key is not included (NO in step S2904), the processing proceeds to step S2906 by skipping the processing in step S2905.

When the processing proceeds to step S2906, the batch setting data encryption processing unit 335 encrypts the batch setting data file. Then, the processing according to the flowchart in FIG. 29 is terminated.

According to FIG. 29, the case that settings included in a batch export request is a setting of the security policy and a setting of a key is described as an example. However, settings other than those above can be included in a batch export request. In such a case, whether a request for exporting the relevant setting is included or not is determined. If the request is included, contents of the relevant setting is recorded in the batch setting data file.

Figure 30:
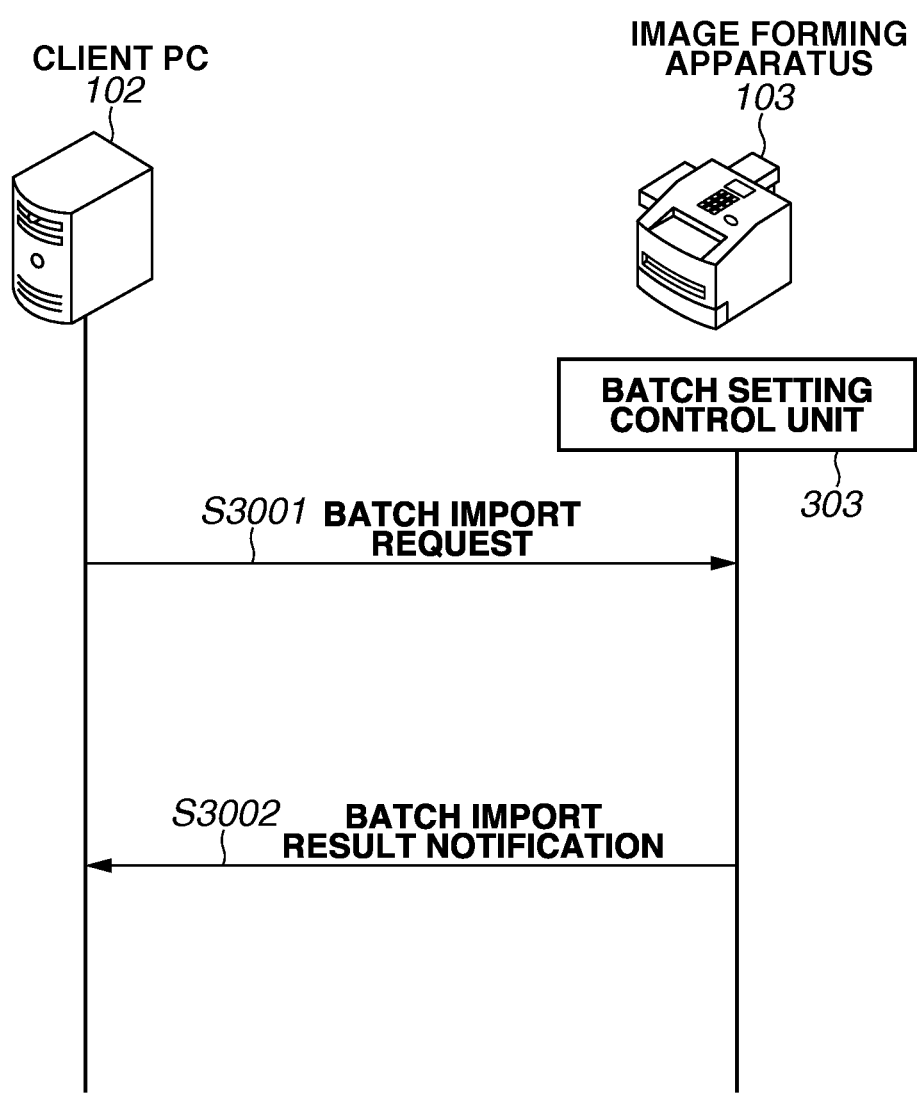
FIG. 30 illustrates processing executed when batch import is performed.

FIG. 30 is a sequence diagram illustrating an example of processing to be executed when the settings of the devices in the image forming apparatus 101 are collectively imported (when batch import is performed).

Figure 25:
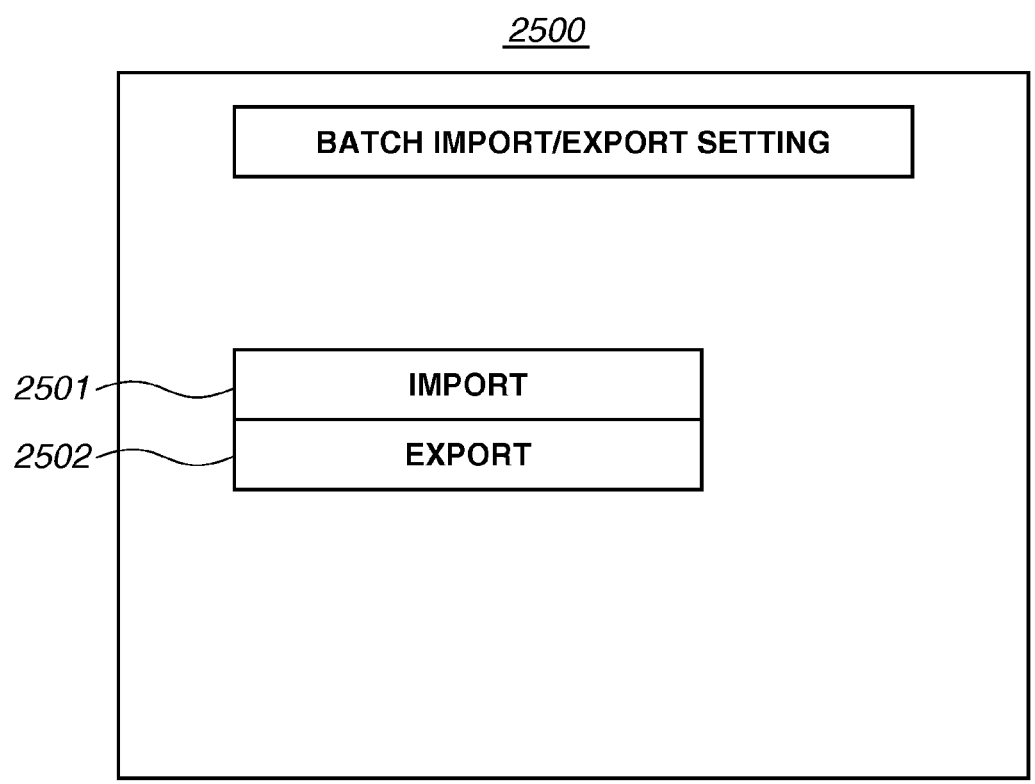
FIG. 25 illustrates a batch import/export screen.
Figure 31A:
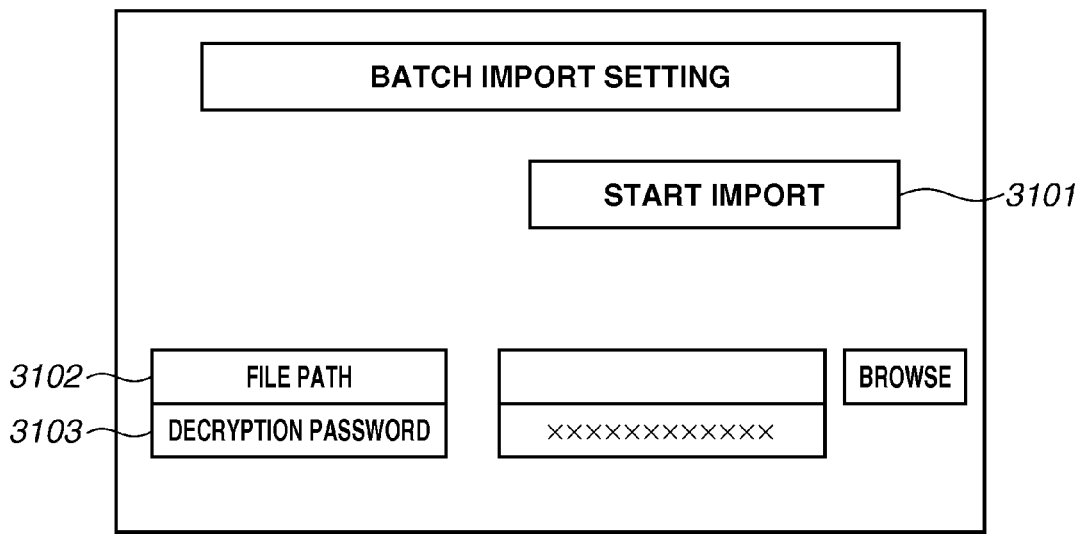
FIG. 31A illustrates a batch import setting screen.
Figure 31B:
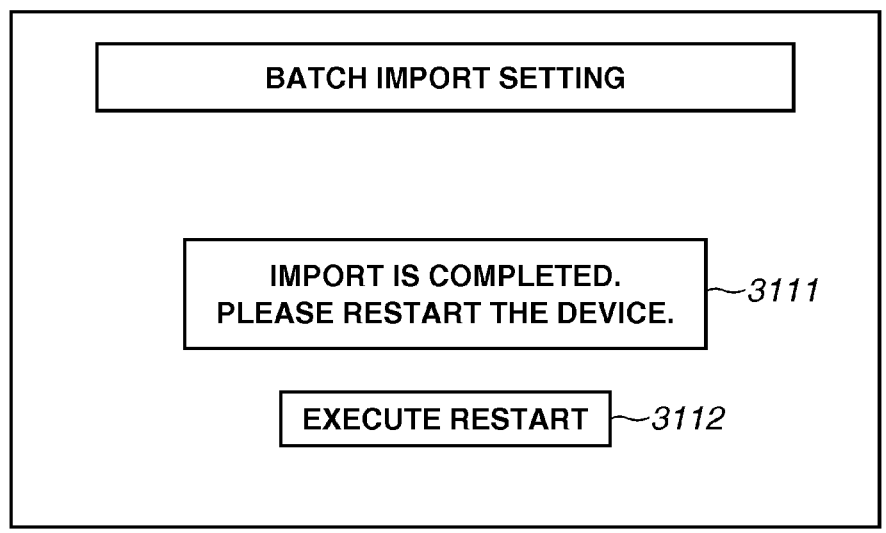
FIG. 31B illustrates an import completion notification screen.

First, when the import button 2501 on the batch import/export screen 2500 shown in FIG. 25 is pressed, the browser screen is shifted from the batch import/export screen 2500 to a screen for performing batch import (see FIGS. 31A, 31B, and the like). The processing until the batch import/export screen 2500 is displayed is described above by referring to FIG. 23, so that detail descriptions of the processing are omitted here.

FIG. 31A illustrates an example of a batch import setting screen 3100 for instructing a start of batch import, and FIG. 31B illustrates an example of an import completion notification screen 3110.

A user operates a file search field 3102 to select a file to be imported (a batch setting data file). Further, a user inputs a decryption password to a decryption password entry field 3103. The batch setting data can include, for example, only a setting of the security policy, only key data, or both of the setting of the security policy and the key data. As described above, according to the present exemplary embodiment, a target of batch import can be selected.

When an import start button 3101 is pressed after selection of a file to be imported and input of the decryption password, in step S3001, the client PC 102 transmits a batch import request to the image forming apparatus 101. By this operation, processing for performing batch import is started. When the batch import is completed, in step S3002, the image forming apparatus 101 notifies the client PC 102 of completion of the batch import. In FIG. 30, a notification indicating a result of batch import is expressed as a batch import result notification.

When the batch import is completed, the client PC 102 displays the import completion notification screen 3110 as illustrated in FIG. 31B. On the import completion notification screen 3110, a message 3111 for prompting a user to restart the image forming apparatus 101 is displayed. If a restart execution button 3112 is pressed, the image forming apparatus 101 is restarted, and the imported settings are reflected in the next start up. In this regard, the import completion notification screen 3110 may be displayed by not the client PC 102 but the image forming apparatus 101. In such a case, the image forming apparatus 101 can display the import completion notification screen 3110 after transmitting a notification indicating a result of batch import to the client PC 102.

Figure 32:
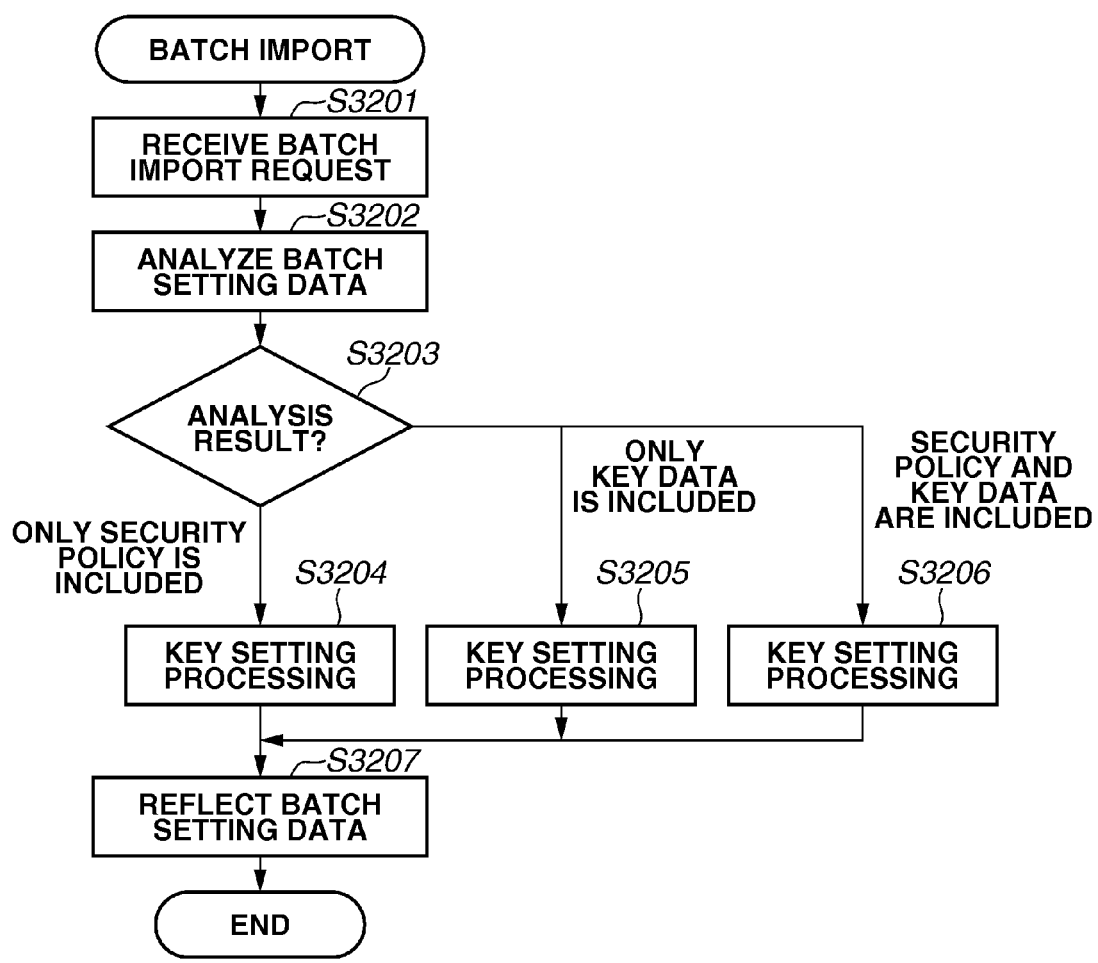
FIG. 32 is a flowchart illustrating processing executed when a batch import request is received.

FIG. 32 is a flowchart illustrating an example of processing executed by the image forming apparatus 101 when a batch import request is received.

In step S3201, the batch import request reception unit 331 receives a batch import request.

Next, in step S3202, the batch setting data analysis unit 334 analyzes batch setting data included in the batch import request.

Next, in step S3203, the batch setting data analysis unit 334 confirms a setting for performing batch import based on an analysis result in step S3202. In the example shown in FIG. 32, the processing is separated into a case when only the setting of the security policy is included, a case when only the key data is included, and a case when both of the setting of the security policy and the key data are included in the batch setting data.

Figure 33:
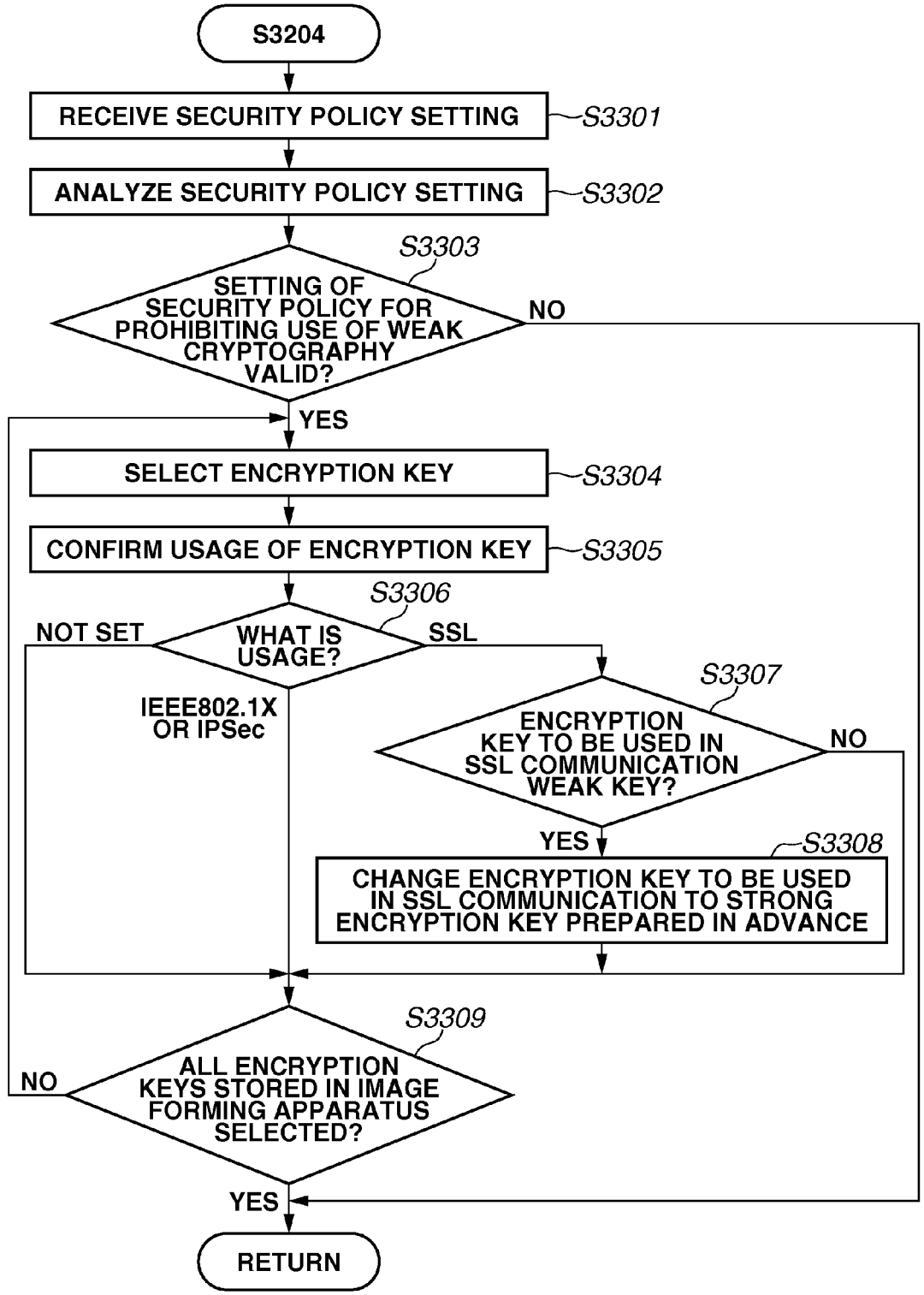
FIG. 33 is a flowchart illustrating details of processing in step S3204.

FIG. 33 is a flowchart illustrating an example of key setting processing (in step S3204) when the batch setting data includes the setting of the security policy. FIG. 34 is a flowchart illustrating an example of the key setting processing (in step S3205) when the batch setting data includes the key data. FIG. 35 is a flowchart illustrating an example of the key setting processing (in step S3206) when the batch setting data includes both of the setting of the security policy and the key data.

After the processing in any one of steps S3204, S3205, and S3206, in step S3207, the batch setting data reflection unit 336 reflects the batch setting data with respect to the image forming apparatus 101. Then, the processing according to the flowchart in FIG. 32 is terminated.

As described above, as a result of the determination in step S3203, if the batch setting data includes only the setting of the security policy, the processing proceeds to step S3204. Details of the processing in step S3204 is described below with reference to FIG. 33.

In step S3301, the policy reception unit 311 receives the setting of the security policy which is requested to be collectively imported by the batch setting data.

Next, in step S3302, the policy analysis unit 312 analyzes the setting of the security policy received in step S3301.

Then, in step S3303, the policy analysis unit 312 determines whether the security policy which is requested to be collectively imported is the security policy for prohibiting use of a weak cryptography, and the setting of the relevant security policy is valid.

As a result of the determination, if the security policy which is requested to be collectively imported is not the security policy for prohibiting use of a weak cryptography (NO in step S3303), the processing according to the flowchart in FIG. 33 is terminated. In addition, if the security policy which is requested to be collectively imported is the security policy for prohibiting use of a weak cryptography, but the setting of the security policy is not valid (NO in step S3303), the processing according to the flowchart in FIG. 33 is terminated.

On the other hand, if the security policy which is requested to be collectively imported is the security policy for prohibiting use of a weak cryptography, and the setting of the security policy is valid (YES in step S3303), the processing proceeds to step S3304.

In step S3304, the key setting confirmation unit 321 selects an encryption key which has not yet been selected from among all encryption keys set in the image forming apparatus 101 as encryption keys to be used in the encryption communication with an external apparatus.

Next, in step S3305, the key setting confirmation unit 321 confirms a usage of the encryption key selected in step S3304.

Then, in step S3306, the key setting confirmation unit 321 determines what is the usage of the encryption key selected in step S3304. The method of determination in step S3306 can be realized by the same method performed in step S906, for example, so that the detail descriptions thereof are omitted here.

As a result of the determination, if the usage of the encryption key selected in step S3304 is not set, the processing proceeds to step S3309 described below by skipping the processing in steps S3307 and S3308. In addition, as a result of the determination in step S3306, if the usage of the encryption key selected in step S3304 is IEEE802.1X or IPSec, the processing also proceeds to step S3309 described below by skipping the processing in steps S3307 and S3308.

On the other hand, as a result of the determination, if the usage of the encryption key selected in step S3304 is SSL, the processing proceeds to step S3307.

In step S3307, the key changing unit 322 determines whether the encryption key selected in step S3304 (the encryption key to be used in the SSL communication) is a weak encryption key. The determination in step S3307 can be realized by the same method performed in step S907 in FIG. 9, for example, so that the detail descriptions thereof are omitted here.

As a result of the determination, if it is determined that the encryption key selected in step S3304 is not the weak encryption key (NO in step S3307), the processing proceeds to step S3309 described below by skipping the processing in step S3308. On the other hand, if it is determined that the encryption key selected in step S3304 is the weak encryption key (YES in step S3307), the processing proceeds to step S3308. In the case that the processing proceeds to step S3308, even though the security policy for prohibiting use of a weak cryptography is valid (ON), the weak encryption key is set in the image forming apparatus 101. Therefore, in step S3308, the key changing unit 322 changes the encryption key selected in step S3304 (the encryption key to be used in the SSL communication) to the strong encryption key (Default Key) prepared in advance as an encryption key for SSL. Then, the processing proceeds to step S3309.

In step S3309, the key setting confirmation unit 321 determines whether all of the encryption keys set in the image forming apparatus 101 as the encryption keys to be used in the communication with the external apparatus are selected. As a result of the determination, if all of the encryption keys are not selected (NO in step S3309), the processing returns to step S3304. Then, a usage of the encryption key which has not yet been selected is determined, and if needed, necessity of changing the encryption key is determined and the encryption key is changed. When all of the encryption keys are selected as described above, the processing according to the flowchart in FIG. 33 is terminated, and the processing proceeds to step S3207 in FIG. 32.

As described above, as a result of the determination in step S3203 in FIG. 32, if the batch setting data includes only the key data, the processing proceeds to step S3205. Details of the processing in step S3205 is described below with reference to FIG. 34.

In step S3401, the key reception unit 324 receives the key data which is requested to be collectively imported by the batch setting data.

Next, in step S3402, the policy analysis unit 312 determines whether the security policy for prohibiting use of a weak cryptography is valid (ON) in the image forming apparatus 101.

As a result of the determination, if the security policy for prohibiting use of a weak cryptography is not valid (ON) in the image forming apparatus 101 (NO in step S3402), the processing proceeds to step S3409 described below by skipping the processing in steps S3403 to S3408.

On the other hand, if the security policy for prohibiting use of a weak cryptography is valid (ON) in the image forming apparatus 101 (YES in step S3402), the processing proceeds to step S3403.

It is regarded that when the encryption key to be imported is the encryption key to be used in the SSL communication and the encryption key is a weak key, the security policy for prohibiting use of a weak cryptography is valid (ON) in the image forming apparatus 101. In this case, if the encryption key is set, an encryption key going against to the security policy will be set. Accordingly, the image forming apparatus 101 becomes unable to perform the SSL communication. In order to prevent occurrence of such a case, determination in step S3402 is performed according to the present exemplary embodiment.

In step S3403, the key analysis unit 325 analyzes the key data received in step S3401.

Next, in step S3404, the key setting confirmation unit 321 selects an encryption key which has not yet been selected from among all imported encryption keys.

Next, in step S3405, the key setting confirmation unit 321 confirms a usage of the encryption key selected in step S3404.

Then, in step S3406, the key setting confirmation unit 321 determines what is the usage of the encryption key selected in step S3404. The method of determination in step S3406 can be realized by the same method performed in step S906, for example, so that the detail descriptions thereof are omitted here.

As a result of the determination, if the usage of the encryption key selected in step S3404 is not set, the processing proceeds to step S3409 described below by skipping the processing in steps S3407 and S3408. In addition, as a result of the determination, if the usage of the encryption key selected in step S3404 is IEEE802.1X or IPSec, the processing also proceeds to step S3409 described below by skipping the processing in steps S3407 and S3408.

On the other hand, as a result of the determination, if the usage of the encryption key selected in step S3404 is SSL, the processing proceeds to step S3407.

In step S3407, the key changing unit 322 determines whether the encryption key selected in step S3404 (the encryption key to be used in the SSL communication) is a weak encryption key. The determination in step S3407 can be realized by the same method performed in step S907 in FIG. 9, for example, so that the detail descriptions thereof are omitted here.

As a result of the determination, if it is determined that the encryption key selected in step S3404 is not the weak encryption key (NO in step S3407), the processing proceeds to step S3409 described below by skipping the processing in step S3408. On the other hand, if it is determined that the encryption key selected in step S3404 is the weak encryption key (YES in step S3407), the processing proceeds to step S3408. In the case that the processing proceeds to step S3408, even though the security policy for prohibiting use of a weak cryptography is valid (ON), the weak encryption key is imported as the encryption key to be used in the SSL communication. Therefore, in step S3408, the key changing unit 322 changes the encryption key selected in step S3404 (the encryption key to be used in the SSL communication) to the strong encryption key (Default Key) prepared in advance as an encryption key for SSL. Then, the processing proceeds to step S3409.

In step S3409, the key setting confirmation unit 321 determines whether all of the imported encryption keys are selected. As a result of the determination, if all of the encryption keys are not selected (NO in step S3409), the processing returns to step S3404. Then, a usage of the encryption key which has not yet been selected is determined, and if needed, necessity of changing the encryption key is determined and the encryption key is changed. When all of the encryption keys are selected as described above, the processing according to the flowchart in FIG. 34 is terminated, and the processing proceeds to step S3207 in FIG. 32.

As described above, as a result of the determination in step S3203 in FIG. 32, if the batch setting data includes both of the setting of the security policy and the key data, the processing proceeds to step S3206. Details of the processing in step S3206 is described below with reference to FIG. 35.

In step S3501, the policy reception unit 311 receives the setting of the security policy which is requested to be collectively imported by the batch setting data.

Next, in step S3502, the key reception unit 324 receives the key data which is requested to be collectively imported by the batch setting data.

Next, in step S3503, the policy analysis unit 312 analyzes the setting of the security policy received in step S3501.

Next, in step S3504, the key analysis unit 325 analyzes the key data received in step S3502.

Next, in step S3505, the policy analysis unit 312 determines whether the security policy which is requested to be collectively imported is the security policy for prohibiting use of a weak cryptography, and the setting of the security policy is valid.

As a result of the determination, if the security policy which is requested to be collectively imported is not the security policy for prohibiting use of a weak cryptography (NO in step S3505), the processing according to the flowchart in FIG. 35 is terminated. In addition, if the security policy which is requested to be collectively imported is the security policy for prohibiting use of a weak cryptography, but the setting of the security policy is not valid (NO in step S3505), the processing according to the flowchart in FIG. 53 is terminated.

On the other hand, if the security policy which is requested to be collectively imported is the security policy for prohibiting use of a weak cryptography, and the setting of the security policy is valid (YES in step S3505), the processing proceeds to step S3506.

In step S3506, the key setting confirmation unit 321 selects an encryption key which has not yet been selected from among all imported encryption keys.

Next, in step S3507, the key setting confirmation unit 321 confirms a usage of the encryption key selected in step S3506.

Next, in step S3508, the key setting confirmation unit 321 determines what is the usage of the encryption key selected in step S3506. The method of determination in step S3508 can be realized by the same method performed in step S906, for example, so that the detail descriptions thereof are omitted here.

As a result of the determination, if the usage of the encryption key selected in step S3506 is not set, the processing proceeds to step S3511 described below by skipping the processing in steps S3509 and S3510. In addition, as a result of the determination, if the usage of the encryption key selected in step S3506 is IEEE802.1X or IPSec, the processing also proceeds to step S3511 described below by skipping the processing in steps S3509 and S3510.

On the other hand, as a result of the determination in step S3508, if the usage of the encryption key selected in step S3506 is SSL, the processing proceeds to step S3509.

In step S3509, the key changing unit 322 determines whether the encryption key selected in step S3506 (the encryption key to be used in the SSL communication) is a weak encryption key. The determination in step S3509 can be realized by the same method performed in step S907 in FIG. 9, for example, so that the detail descriptions thereof are omitted here.

As a result of the determination, if it is determined that the encryption key selected in step S3506 is not the weak encryption key (NO in step S3509), the processing proceeds to step S3511 described below by skipping the processing in step S3510. On the other hand, if it is determined that the encryption key selected in step S3506 is the weak encryption key (YES in step S3509), the processing proceeds to step S3510. In the case that the processing proceeds to step S3510, even though the security policy for prohibiting use of a weak cryptography is valid (ON), the weak encryption key is imported as the encryption key to be used in the SSL communication. Therefore, in step S3510, the key changing unit 322 changes the encryption key selected in step S3304 (the encryption key to be used in the SSL communication) to the strong encryption key (Default Key) prepared in advance as an encryption key for SSL. Then, the processing proceeds to step S3511.

Batch setting data is generally obtained by exporting settings of a certain apparatus. Therefore, generally, the security policy for prohibiting use of a weak cryptography is valid (ON), and a weak encryption key is not imported as an encryption key to be used in the SSL communication. However, batch setting data is sometimes edited by an application installed in the client PC 102. In such a case, it is conceivable that batch setting data including an erroneous setting is imported. Therefore, according to the present exemplary embodiment, the determination in step S3509 is performed at the time of import.

When the processing proceeds to step S3511 as described above, the key setting confirmation unit 321 determines whether all of the imported encryption keys are selected. As a result of the determination, if all of the encryption keys are not selected (NO in step S3511), the processing returns to step S3506. Then, a usage of the encryption key which has not yet been selected is determined, and if needed, necessity of changing the encryption key is determined and the encryption key is changed. When all of the encryption keys are selected as described above, the processing according to the flowchart in FIG. 35 is terminated, and the processing proceeds to step S3207 in FIG. 32.

According to the present exemplary embodiment, the encryption key to be used in the SSL communication is changed to the Default Key as with the first exemplary embodiment. However, the Default Key is a self-signed certificate which the image forming apparatus 101 has in advance, and is not certified by a certificate authority. Thus, according to the present exemplary embodiment, when the SSL connection is performed from the client PC 102 to the image forming apparatus 101, the using key confirmation screen 1900 illustrated in FIG. 19 is displayed as with the case of the first exemplary embodiment. Accordingly, as described in the first exemplary embodiment, the present exemplary embodiment can cause a user (a security administrator) to reconsider an operation such as introducing a new encryption key after the encryption key to be used in the SSL communication is temporarily changed to the Default Key.

As described above, according to the present exemplary embodiment, batch setting data which includes at least either one of setting data of one or a plurality of security policies and one or a plurality of key data pieces is transmitted from the client PC 102 to the image forming apparatus 101. Then, if the setting data of the security policy for prohibiting use of a weak cryptography is included in the batch setting data, and SSL is set as a usage of the weak encryption key of the image forming apparatus 101, the weak encryption key is changed to the strong encryption key. Further, if the data of the weak encryption key of which usage is SSL is included in the batch setting data, and the security policy for prohibiting use of a weak cryptography is set in the image forming apparatus 101, the weak encryption key is changed to the strong encryption key. Accordingly, when the setting of the security policy and the key data are collectively applied to the image forming apparatus 101, it can suppress a case that the encryption key of which usage is SSL becomes a key going against to the security policy. Thus, it can suppress a case that the security policy cannot be reset.

According to the present exemplary embodiment, a strong encryption key to be replaced with a weak encryption key may be generated instead of changing the weak encryption key to the strong encryption key prepared in advance by installing the key generation unit 323 to the key control unit 302 instead of the key changing unit 322, as with the second exemplary embodiment.

In addition to the above, the present exemplary embodiment can also employ various modifications described in the first and the second exemplary embodiments.

Further, the exemplary embodiments described above are merely examples for implementing the present invention, so that the examples should not be construed restrictively limiting the technical scope of the present invention. In other words, the present invention can be implemented in the various forms without departing from the technical idea and/or the main features thereof.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-192198 filed Sep. 17, 2013 and No. 2014-081200 filed Apr. 10, 2014, which are hereby incorporated by reference herein in their entirety.

What is claimed is:

1. An image forming apparatus comprising:
one or more processors; and
one or more non-transitory computer-readable media storing one or more programs, the one or more programs comprising instructions that, when executed by the one or more processors, cause the one or more processors to perform operations comprising:
    setting a first encryption key as an encryption key to be used for encryption communication according to a specific protocol, wherein the first encryption key is selected from a plurality of encryption keys stored on the image forming apparatus, the plurality of encryption keys including a default key;
    obtaining security setting information for limiting use of one or more encryption keys;
    identifying a signature algorithm of the first encryption key and a length of a public key of the first encryption key;
    determining whether the first encryption key has at least a predetermined encryption strength based on the security setting information and at least one of the signature algorithm and the length of the public key; and
    in response to determining that the first encryption key has not at least the predetermined encryption strength, setting the default key as the encryption key to be used for encryption communication according to the specific protocol such that the first encryption key is not set as the encryption key to be used for encryption communication according to the specific protocol.

2. The image forming apparatus according to claim 1, wherein the specific protocol is a Secure Sockets Layer (SSL).

3. The image forming apparatus according to claim 1, wherein the obtaining the security setting information comprises obtaining, from a client computer, the security setting information using the specific protocol.

4. The image forming apparatus according to claim 1, the operations further comprising:
    setting a second encryption key as an encryption key to be used for encryption communication according to a second protocol; and
    in a case where the second encryption key has not at least the predetermined encryption strength, prohibiting encryption communication according to the second protocol.

5. The image forming apparatus according to claim 1, the operations further comprising:
    determining whether the first encryption key is to be limited based on the security setting information according to a fact that the security setting information is obtained.

6. The image forming apparatus according to claim 1, the operations further comprising:
    providing notification of an error in a case where the set encryption key is changed.

7. The image forming apparatus according to claim 1, wherein the default key has at least the predetermined encryption strength.

8. The image forming apparatus according to claim 1, wherein the determining whether the first encryption key has at least the predetermined encryption strength comprises determining whether use of the first encryption key is prohibited based on at least one of the signature algorithm and the length of the public key.

9. The image forming apparatus according to claim 1, wherein the determining whether the first encryption key has at least the predetermined encryption strength comprises determining whether use of the signature algorithm is prohibited.

10. The image forming apparatus according to claim 1, wherein the determining whether the first encryption key has at least the predetermined encryption strength comprises determining whether use of the public key is prohibited based on the length of the public key.

11. A method for controlling an image forming apparatus, the method comprising:
setting a first encryption key as an encryption key to be used for encryption communication according to a specific protocol, wherein the first encryption key is selected from a plurality of encryption keys stored on the image forming apparatus, the plurality of encryption keys including a default key;
obtaining security setting information for limiting use of one or more encryption keys;
identifying a signature algorithm of the first encryption key and a length of a public key of the first encryption key;
determining whether the first encryption key has at least a predetermined encryption strength based on the security setting information and at least one of the signature algorithm and the length of the public key; and
in response to determining that the first encryption key has not at least the predetermined encryption strength, setting the default key as the encryption key to be used for encryption communication according to the specific protocol such that the first encryption key is not set as the encryption key to be used for encryption communication according to the specific protocol.

12. A non-transitory computer-readable storage medium storing instructions that, when executed by a computer of an image forming apparatus, cause the computer to perform operations comprising:
setting a first encryption key as an encryption key to be used for encryption communication according to a specific protocol, wherein the first encryption key is selected from a plurality of encryption keys stored on the image forming apparatus, the plurality of encryption keys including a default key;
obtaining security setting information for limiting use of one or more encryption keys;
identifying a signature algorithm of the first encryption key and a length of a public key of the first encryption key;
determining whether the first encryption key has at least a predetermined encryption strength based on the security setting information and at least one of the signature algorithm and the length of the public key; and
in response to determining that the set first encryption key has not at least the predetermined encryption strength, setting the default key as the encryption key to be used for encryption communication according to the specific protocol such that the first encryption key is not set as the encryption key to be used for encryption communication according to the specific protocol.

13. An image forming apparatus comprising:
one or more processors; and
one or more computer-readable media storing one or more programs, the one or more programs comprising instructions that, when executed by the one or more processors, cause the one or more processors to perform operations comprising:
setting a first encryption key as an encryption key utilized for executing an encryption communication according to a first protocol, the first encryption key being selected from a plurality of encryption keys stored in a storing unit;
setting a second encryption key as an encryption key utilized for executing an encryption communication according to a second protocol, the second encryption key being selected from the plurality of encryption keys stored in the storing unit;
obtaining security setting information for limiting use of one or more encryption keys in terms of encryption strength;
first performing, in a case where a use of the first encryption key is prohibited according to the security setting information, a control to change an encryption key utilized for executing an encryption communication according to the first protocol from the first encryption key to another encryption key; and
second performing, in a case where a use of the second encryption key is prohibited according to the security setting information, a control to prohibit executing an encryption communication according to the second encryption protocol.

14. The image forming apparatus according to claim 13, wherein
in the second performing, in a case where the use of the second encryption key is prohibited according to the security setting information, an encryption key utilized for executing an encryption communication according to the second protocol is not changed from the second encryption key.

15. The image forming apparatus according to claim 13, wherein
the plurality of keys stored in the storing unit include a default key; and
in the first performing, in a case where the use of the first encryption key is prohibited according to the security setting information, the control to change an encryption key utilized for executing an encryption communication according to the first protocol from the first encryption key to the default encryption key is performed.

16. The image forming apparatus according to claim 13, the operations further comprising:
generating an encryption key which is not prohibited according to the security setting information to be utilized for executing an encryption communication according to the first protocol,
wherein, in the first performing, in a case where the use of the first encryption key is prohibited according to the security setting information, the control to change an encryption key utilized for executing an encryption communication according to the first protocol from the first encryption key to the generated encryption key is performed.

17. The image forming apparatus according to claim 13, the operations further comprising:
determining, based on the security setting information and at least one of a signature algorithm of the first encryption key and a length of a public key of the first encryption key, whether the first encryption key has at least a predetermined encryption strength which is needed for the encryption key utilized for executing an encryption communication according to a first protocol; and determining, in a case where the first encryption key does not have the predetermined encryption strength, to prohibit the use of the first encryption key.

18. The image forming apparatus according to claim 13, wherein
in the first performing, in the case where the use of the first encryption key is prohibited according to the security setting information, the control is performed such that the first encryption key is not set as the encryption key to be used for an encryption communication according to the first protocol.

19. A method for controlling an image forming apparatus, the method comprising:
setting a first encryption key as an encryption key utilized for executing an encryption communication according to a first protocol, the first encryption key being selected from a plurality of encryption keys stored in a storing unit;
setting a second encryption key as an encryption key utilized for executing an encryption communication according to a second protocol, the second encryption key being selected from the plurality of encryption keys stored in the storing unit;
obtaining security setting information for limiting a use of one or more encryption keys in terms of encryption strength;
first performing, in a case where a use of the first encryption key is prohibited according to the security setting information, a control to change an encryption key utilized for executing an encryption communication according to the first protocol from the first encryption key to another encryption key; and
second performing, in a case where a use of the second encryption key is prohibited according to the security setting information, a control to prohibit executing an encryption communication according to the second encryption protocol.

20. A non-transitory computer-readable storage medium storing instructions that, when executed by a computer of an image forming apparatus, cause the computer to perform operations comprising:
setting a first encryption key as an encryption key utilized for executing an encryption communication according to a first protocol, the first encryption key being selected from a plurality of encryption keys stored in a storing unit;
setting a second encryption key as an encryption key utilized for executing an encryption communication according to a second protocol, the second encryption key being selected from the plurality of encryption keys stored in the storing unit;
obtaining security setting information for limiting a use of one or more encryption keys in terms of encryption strength;
first performing, in a case where a use of the first encryption key is prohibited according to the security setting information, a control to change an encryption key utilized for executing an encryption communication according to the first protocol from the first encryption key to another encryption key; and
second performing, in a case where a use of the second encryption key is prohibited according to the security setting information, a control to prohibit executing an encryption communication according to the second encryption protocol.

* * * * *